US012080306B2

(12) United States Patent
Rettelbach et al.

(10) Patent No.: US 12,080,306 B2
(45) **Date of Patent: *Sep. 3, 2024**

(54) AUDIO ENCODER, AUDIO DECODER, METHODS FOR ENCODING AND DECODING AN AUDIO SIGNAL, AUDIO STREAM AND A COMPUTER PROGRAM

(71) Applicant: Fraunhofer-Gesellschaft zur Foerderung der Angewandten Forschung e.V., Munich (DE)

(72) Inventors: Nikolaus Rettelbach, Nuremberg (DE); Bernhard Grill, Lauf (DE); Guillaume Fuchs, Nuremberg (DE); Stefan Geyersberger, Wuerzburg (DE); Markus Multrus, Nuremberg (DE); Harald Popp, Tuchenbach (DE); Juergen Herre, Buckenhof (DE); Stefan Wabnik, Ilmenau (DE); Gerald Schuller, Erfurt (DE); Jens Hirschfeld, Heringen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/522,762

(22) Filed: Nov. 29, 2023

(65) Prior Publication Data

US 2024/0096338 A1 Mar. 21, 2024

Related U.S. Application Data

(63) Continuation of application No. 17/322,656, filed on May 17, 2021, now Pat. No. 11,869,521, which is a (Continued)

(51) Int. Cl.
*G10L 19/035* (2013.01)
*G10L 19/008* (2013.01)
(Continued)

(52) U.S. Cl.
CPC .......... *G10L 19/035* (2013.01); *G10L 19/008* (2013.01); *G10L 19/02* (2013.01);
(Continued)

(58) Field of Classification Search
None
See application file for complete search history.

(56) References Cited

U.S. PATENT DOCUMENTS 4,703,505 A 10/1987 Seiler et al.
4,956,871 A 9/1990 Swaminathan
(Continued)

FOREIGN PATENT DOCUMENTS

EP 0968497 1/2000
EP 1395980 A1 3/2004
(Continued)

OTHER PUBLICATIONS

"3rd Generation Partnership Project", Technical Specification Group Service and System Aspects; Audio Codec Processing Functions; Extended Adaptive Muli-Rate-Wideband (AMR-WB+) Codec; Transcoding Functions (Release 6)3GPP TS 26.290 V6.1.0, Dec. 2004, 1-86.

(Continued)

*Primary Examiner* — Douglas Godbold
(74) *Attorney, Agent, or Firm* — Perkins Coie LLP; Michael A. Glenn

(57) ABSTRACT

An encoder for providing an audio stream on the basis of a transform-domain representation of an input audio signal includes a quantization error calculator configured to determine a multi-band quantization error over a plurality of (Continued)

frequency bands of the input audio signal for which separate band gain information is available. The encoder also includes an audio stream provider for providing the audio stream such that the audio stream includes information describing an audio content of the frequency bands and information describing the multi-band quantization error. A decoder for providing a decoded representation of an audio signal on the basis of an encoded audio stream representing spectral components of frequency bands of the audio signal includes a noise filler for introducing noise into spectral components of a plurality of frequency bands to which separate frequency band gain information is associated on the basis of a common multi-band noise intensity value.

3 Claims, 20 Drawing Sheets

Related U.S. Application Data continuation of application No. 15/643,908, filed on Jul. 7, 2017, now Pat. No. 11,024,323, which is a continuation of application No. 14/582,828, filed on Dec. 24, 2014, now Pat. No. 9,711,157, which is a continuation of application No. 13/004,508, filed on Jan. 11, 2011, now Pat. No. 9,043,203, which is a continuation of application No. PCT/EP2009/004602, filed on Jun. 25, 2009.

(60) Provisional application No. 61/103,820, filed on Oct. 8, 2008, provisional application No. 61/079,872, filed on Jul. 11, 2008.

(51) Int. Cl.

| | |
|---|---|
| ***G10L 19/02*** | (2013.01) |
| ***G10L 19/028*** | (2013.01) |
| ***G10L 19/032*** | (2013.01) |
| *G10L 25/18* | (2013.01) |

(52) U.S. Cl.

CPC ........ *G10L 19/0204* (2013.01); *G10L 19/028* (2013.01); *G10L 19/032* (2013.01); *G10L 25/18* (2013.01)

(56) References Cited

U.S. PATENT DOCUMENTS

| | | | | | |
|---|---|---|---|---|---|
| 5,797,120 | A * | 8/1998 | Ireton | G10L 19/08 | 704/226 |
| 5,960,389 | A * | 9/1999 | Jarvinen | G10L 19/012 | 704/215 |
| 6,092,041 | A | 7/2000 | Pan et al. | | |
| 6,240,386 | B1 | 5/2001 | Thyssen et al. | | |
| 7,124,079 | B1 | 10/2006 | Johansson et al. | | |
| 7,212,973 | B2 | 5/2007 | Toyama et al. | | |
| 7,275,936 | B1 | 10/2007 | Ju | | |
| 7,337,118 | B2 | 2/2008 | Davidson et al. | | |
| 7,343,287 | B2 | 3/2008 | Geiger et al. | | |
| 7,613,603 | B2 | 11/2009 | Yamashita | | |
| 8,275,611 | B2 * | 9/2012 | Zong | G10L 21/02 | 704/201 |
| 9,043,203 | B2 * | 5/2015 | Rettelbach | G10L 19/032 | 704/226 |
| 11,024,323 | B2 * | 6/2021 | Rettelbach | G10L 19/028 | |
| 2002/0128838 | A1 | 9/2002 | Veprek | | |
| 2002/0152085 | A1 * | 10/2002 | Tsushima | G10L 19/0208 | 704/500 |
| 2003/0061055 | A1 | 3/2003 | Taori et al. | | |
| 2003/0233234 | A1 | 12/2003 | Truman et al. | | |
| 2004/0002854 | A1 | 1/2004 | Ha | | |
| 2004/0170290 | A1 * | 9/2004 | Chang | G10L 19/032 | 381/94.1 |
| 2005/0027520 | A1 * | 2/2005 | Mattila | G10L 21/0208 | 704/228 |
| 2005/0122961 | A1 | 6/2005 | Ban | | |
| 2005/0157884 | A1 * | 7/2005 | Eguchi | G10L 19/008 | 381/23 |
| 2005/0261892 | A1 | 11/2005 | Makinen et al. | | |
| 2005/0278171 | A1 * | 12/2005 | Suppappola | G10L 19/012 | 704/227 |
| 2006/0111899 | A1 * | 5/2006 | Padhi | G10L 19/005 | 704/E19.003 |
| 2006/0136198 | A1 | 6/2006 | Kim et al. | | |
| 2006/0241940 | A1 | 10/2006 | Ramprashad | | |
| 2007/0016403 | A1 | 1/2007 | Schuller et al. | | |
| 2007/0162278 | A1 | 7/2007 | Miyasaka et al. | | |
| 2007/0247383 | A1 | 10/2007 | Krupa et al. | | |
| 2007/0274383 | A1 * | 11/2007 | Yu | H04N 19/126 | 375/E7.184 |
| 2007/0282603 | A1 * | 12/2007 | Bessette | G10L 19/265 | 704/E19.044 |
| 2008/0040104 | A1 * | 2/2008 | Ide | G10L 19/087 | 704/219 |
| 2009/0192791 | A1 * | 7/2009 | El-Maleh | G10L 19/012 | 381/94.1 |
| 2009/0306992 | A1 * | 12/2009 | Ragot | G10L 19/24 | 704/500 |
| 2010/0100373 | A1 * | 4/2010 | Ehara | G10L 19/26 | 704/219 |
| 2010/0241437 | A1 | 9/2010 | Taleb et al. | | |
| 2011/0170711 | A1 | 7/2011 | Rettelbach et al. | | |
| 2011/0173012 | A1 | 7/2011 | Rettelbach et al. | | |
| 2011/0264454 | A1 | 10/2011 | Ullberg et al. | | |

FOREIGN PATENT DOCUMENTS

| | | | |
|---|---|---|---|
| EP | 1087379 | | 6/2005 |
| EP | 1736966 | | 12/2006 |
| EP | 2606487 | A2 | 6/2013 |
| EP | 2631905 | A1 | 8/2013 |
| JP | H09-34493 | | 2/1997 |
| RU | 2237296 | C2 | 9/2004 |
| RU | 2289858 | C2 | 12/2006 |
| RU | 2294565 | C2 | 2/2007 |
| TW | 454170 | B | 9/2001 |
| WO | 0241302 | A1 | 5/2002 |
| WO | 02/091363 | A1 | 11/2002 |
| WO | 2002/091363 | | 11/2002 |
| WO | 2005004113 | A1 | 1/2005 |
| WO | 2005078704 | A1 | 8/2005 |
| WO | 2005/081229 | | 9/2005 |
| WO | 2009/029036 | | 3/2009 |
| WO | 2012024379 | A2 | 2/2012 |

OTHER PUBLICATIONS

"Audio codec processing functions; Extended Adaptive Multi-Rate-Wideband (AMR-WB+) codec; Conformance testing (Release 7)", 3rd Generation Partnership Project; Technical Specification Group Services and System Aspects, ARIB STD-T63-26.274 V7.0.0, Jun. 2007, pp. 1-21.

"Extended Adaptive Multi-Rate-Wideband (AMR-WB+) codec", 3rd Generation Partnership Project; 3GPP TS 26.290 V6.1.0, Dec. 2004, 86 total pages.

"Information Technology—Generic coding of moving pictures and associated audio information—Part 7: Advanced Audio Coding (AAC)", International Standard, ISO/IEC 13818-7, Second edition, 2003, 198 total.

Herre, Juergen , et al., "Overview of MPEG-4 Audio and Its Applications in Mobile Communications", IEEE Int'l Conference on Signal ProcessingXP010526820, 604-613.

Neuendorf, Max , et al., "A Novel Scheme for Low Bitrate Unified Speech and Audio Coding—MPEG RM0", Audio Engineering Society Convention Paper 7713 Presented at the 126th Convention, 1-13.

(56) References Cited

OTHER PUBLICATIONS

Neuendorf, Max , et al., "Detailed Technical Description of Reference Model 0 of the CfP on Unified Speech and Audio Coding (USAC)", International Organisation for Standardisation Organisation Internationale De Normalisation ISO/IEC JTC1/SC29/WG11 Coding of Moving Pictures and Audio, 1-100.

Ragot, Stephane , et al., "ITU-T G.729.1: An 8-32 KBITS/S Scalable Coder Interoperable With G.729 for Wideband Telephony and Voice Over IP", Int'l Conference on Acoustics, Speech, and Signal Processing, Honolulu, Hawaii, USA, IV-529-IV-532.

* cited by examiner

FIG 4A line number

Encoder:

```
Calculate Mean Quantization error:
nLines = 0;
avgError = 0;

for (band = all scale factor bands) {
  for(line = all spectral lines in band) {
    if(band not quantized to zero) {
      avgError += fabs ( pow(line, 0.75)*scale factor - (int) pow(line, 0.75)*scale factor)
      nLines ++;
    }
  }
}
avgError=avgError / nLines;

noiseLevel=(int) (14+4*ld(avgError);
noiseLevel=max(0, min(7, noiseLevel)

Calculate All zero Scale Factor:
noiseValue=pow(2.f, ((float)(noiseLevel)-14.f)/4.f)
if(noiseLevel>0) {
for (band=all scale factor bands){
  if(band quantized to zero) {
    scf[band]=(INT) (2.f * log( ((energy)/((float)sfbWidth*noiseVal*noiseVal*noiseVal)))/log(2.f));
  }
}
else {
  scf=don't care
}
```

non-quantized, scaled spectral line magnitude value quantized, scaled spectral line magnitude value optional: noiseLevel quantization optional: noiseLevel inverse quantization Noise Level Quantization

```
noiseLevel = (int) (14 + 4*ld(meanLineError);
noiseLevel = max(0, min(7, noiseLevel)
```

FIG 4B $$x\_invquant = Sign(x\_quant)\ |x\_quant|^{\frac{4}{3}}$$

or:

$$x\_ac\_invquant = Sign(x\_ac\_quant)\ |x\_ac\_quant|^{\frac{4}{3}}$$

```
for (g = 0; g< num_window_groups; g++) {
  for (sfb = 0; sfb < max_sfb; sfb++) {
    width = (swb_offset [sfb+1] - swb_offset [sfb]);
    for (win - 0; win < window_group_len[g]; win++) {
      for (bin = 0; bin < width; bin++) {
        x_ac_invquant [g] [sfb] [sfb] [bin] =
sign(x_ac_quant[g] [win] [sfb] [bin])*abs(x_ac_quant[g] [win] [sfb] [bin]) ^ (4/3);
      }
    }
  }
}
```

Decoding Process: Noise Filling Process

FIG 10A line number

```
 1  if (noise_level !=0) {
 2    noiseVal = pow(2, (noise_level-14)/3) ;
 3    noise_offset = noise_offset - 16;
 4  }
 5  else {
 6    noiseVal = 0;
 7    noise_offset = 0;
 8  }
 9  for (g=0; g<num_window_groups; g++) {
10    for (sfb=0; sfb < max_sfb; sfb++) {
11      band_quantized_to_zero=1;                                   -- assume a band is quantized to zero
12      width=(swb_offset [sfb+1] - swb_offset [sfb]);
13      if(swb_offset [sfb] > noiseFillingStartOffset) {
14        for (win=0); win < window_group_len[g]; win++) {
15          for (bin=0; bin < width; bin++) {
16            if (x_ac_invquant [g] [win] [sfb] [bin] ==0) {
17              x_ac_invquand [g] [win] [sfb] [bin] = randomSign () *noiseVal;   -- for scalefactor bands, starting above noiseFillingStartOffset,
18            }                                                     -- add noise of amplitude noiseVal to spectral lines quantized to zero;
19            else {
20              band_quantized_to_zero=0;                           -- for scalefactor bands, starting above noiseFillingStartOffset, if a single
21            }                                                     -- bin of a scalefactor band is≠0, then band is not quantized to zero;
22          }
23        }
24      }
24a     else {
24b       band_quantized_to_zero=0;                                 -- for scalefactor bands, starting below noiseFillingStartOffset, if it is
24c     }                                                           -- always assumed thet the band is not quantized to zero;

25      if(band_quantized_to_zero) {
26        scf[g] [sfb] = scf[g] [sfb] + noise_offset;               -- for scalefactor bands quantized to zero, modify band scalefactor in
27      }                                                           -- dependance on noise offset value
28    }
29  }
```

Data Elements

| | |
|---|---|
| noise_offset | additional offset to modify the scale factor of bands quantized to zero |
| noise_level | integer representing the quantization noise to be added for every spectral line quantized to zero |

Help Elements

| | |
|---|---|
| x_ac_invquant[g][win][sfb][bin] | AAC spectral coefficient for group g, window win, scale-factor band sfb, coefficient bin after inverse quantization. |
| noiseFillingStartOffset[win] | a general offset or noise filling start frequency. The offset is defined to be 20 for short(window_sequence== EIGHT_SHORT_SEQUENCE) and 160 else. |
| noiseVal | The absolute noise Value that replaces every bin quantized to zero. |
| randomSign | random Sign (-1,1) multiplied to noiseVal |
| band_quantized_to_zerol | flag to signal whether a sfb is completely quantized to zero |
| swb_offset[sfb] | index of the lowest spectral coefficient of scale factor band sfb |
| num_window_groups | number of groups of windows which share one set of scalefactors |
| mux_sfb | number scalefactor bands per group |
| window_group_len | number of windows in each group |
| g | group index |
| win | window index within group |
| sfb | scalefactor band index within group |
| swb | scalefactor window band index within window |
| bin | coefficient index |
| num_windows | number of windows of the actual window sequence |

FIG 10B

Noise value in decoder

```
if(noiseLevel !=0)
  noiseValue=pow(2.f((float)(noiseLevel)-14.f)/4.f)
else
  noiseVal=0
```

FIG 13A

Decoder:

"Zero Replacement Value" Calculation:

```
if(noiseLevel !=0)
  noiseValue=pow(2.f((float)(noiseLevel)-14.f)/4.f)
else
  noiseVal=0

for(band=all scale factor bands) {
  for(line=all spectral lines in band) {
    if(band quantized to zero) {

      scf=scf + noise_Offset {
    }
    if(line>noiseFillingStartOffset) {
      if(quantizedSpec[line]==0) {
        quantizedSpec[line]=randomSign()*noiseValue;
      }
    }
  }
}
```

FIG 13B

<u>USAC bitstream payload</u> (Tab. 4.3)

```
usac_raw_data_block ()
{
  single_channel_element () ; and/or
  channel_pair_element () ;
  optional: additional channel elements
}
```

FIG 14A (Tab. 4.4)

```
single_channel_element ()
{
  fd_channel_stream (*,*, noise Filling)
}
```

FIG 14B (Tab. 4.5)

```
channel_pair_element
{
  fd_channel_stream (*,*, noise Filling)(1st channel); and/or
  fd_channel_stream (*,*, noise Filling)(2nd channel)
}
```

FIG 14C (Tab. 4.8)

```
fd_channel_stream ()
{
  global_gain;              e.g. 8 bit
  noise_offset;             e.g. 3 bit
  noise_level;              e.g. 5 bit

  scale_factor_data ();

  tus_data ();              optional

  ac_spectral_data ()
}
```

FIG 14D

Syntax of individual_channel_stream()

| Syntax | No. of bits | Mnemonic |
| --- | --- | --- |
| individual_channel_stream(common_window) | | |
| { | | |
| global_gain; | 8 | uimsbf |
| noise_Offset | 5 | uimsbf |
| noise_Level | 3 | uimsbf |
| if (!common_window) | | |
| ics_info(); | | |
| section_data(); | | |
| scale_factor_data(); | | |
| pulse_data_present; | 1 | uimsbf |
| if (pulse_data_present) { | | |
| pulse_data(); | | |
| } | | |
| tns_data_present; | 1 | uimsbf |
| if(tns_data_present){ | | |
| tns_data(); | | |
| } | | |
| gain_control_data_present; | 1 | uimsbf |
| if (gain_control_data_present) { | | |
| gain_control_data(); | | |
| } | | |
| spectral_data() | | |
| } | | |

FIG 15

AUDIO ENCODER, AUDIO DECODER, METHODS FOR ENCODING AND DECODING AN AUDIO SIGNAL, AUDIO STREAM AND A COMPUTER PROGRAM

CROSS-REFERENCE TO RELATED APPLICATIONS

This application is a continuation of copending U.S. patent application Ser. No. 17/322,656, filed May 17, 2021, which in turn is a continuation of U.S. patent application Ser. No. 15/643,908, filed Jul. 7, 2017 (U.S. Pat. No. 11,024,323 issued Jun. 1, 2021), which in turn is a continuation of U.S. patent application Ser. No. 14/582,828 filed Dec. 24, 2014 (U.S. Pat. No. 9,711,157 issued Jul. 18, 2017), which is a continuation of U.S. patent application Ser. No. 13/004,508, filed Jan. 11, 2011 (U.S. Pat. No. 9,043,203 issued May 26, 2015), which is a continuation of International Application No. PCT/EP2009/004602, filed Jun. 25, 2009, and additionally claims priority from U.S. Patent Application No. U.S. 61/079,872, filed Jul. 11, 2008, and U.S. Patent Application No. 61/103,820 filed Oct. 8, 2008, all of which are incorporated herein by reference in their entirety.

BACKGROUND

Embodiments according to the invention are related to an encoder for providing an audio stream on the basis of a transform-domain representation of an input audio signal. Further embodiments according to the invention are related to a decoder for providing a decoded representation of an audio signal on the basis of an encoded audio stream. Further embodiments according to the invention provide methods for encoding an audio signal and for decoding an audio signal. Further embodiments according to the invention provide an audio stream. Further embodiments according to the invention provide computer programs for encoding an audio signal and for decoding an audio signal.

Generally speaking, embodiments according to the invention are related to a noise filling.

Audio coding concepts often encode an audio signal in the frequency domain. For example, the so-called "advanced audio coding" (AAC) concept encodes the contents of different spectral bins (or frequency bins), taking into consideration a psychoacoustic model. For this purpose, intensity information for different spectral bins is encoded. However, the resolution used for encoding intensities in different spectral bins is adapted in accordance with the psychoacoustic relevances of the different spectral bins. Thus, some spectral bins, which are considered as being of low psychoacoustic relevance, are encoded with a very low intensity resolution, such that some of the spectral bins considered to be of low psychoacoustic relevance, or even a dominant number thereof, are quantized to zero. Quantizing the intensity of a spectral bin to zero brings along the advantage that the quantized zero-value can be encoded in a very bit-saving manner, which helps to keep the bit rate as small as possible. Nevertheless, spectral bins quantized to zero sometimes result in audible artifacts, even if the psychoacoustic model indicates that the spectral bins are of low psychoacoustic relevance.

Therefore, there is a desire to deal with spectral bins quantized to zero, both in an audio encoder and an audio decoder.

Different approaches are known for dealing with spectral bins encoded to zero in transform-domain audio coding systems and also in speech coders.

For example, the MPEG-4 "AAC" (advanced audio coding) uses the concept of perceptual noise substitution (PNS). The perceptional noise substitution fills complete scale factor bands with noise only. Details regarding the MPEG-4 AAC may, for example, be found in the International Standard ISO/IEC 14496-3 (Information Technology—Coding of Audio-Visual Objects—Part 3: Audio). Furthermore, the AMR-WB+ speech coder replaces vector quantization vectors (VQ vectors) quantized to zero with a random noise vector, where each complex spectral value has a constant amplitude, but a random phase. The amplitude is controlled by one noise value transmitted with the bitstream. Details regarding the AMR-WB+ speech coder may, for example, be found in the technical specification entitled "Third Generation Partnership Project; Technical Specification Group Services and System Aspects; Audio Codec Processing Functions; Extended Adaptive Multi-Rate-Wide Band (AMR-WB+) Codec; Transcoding Functions (Release Six)", which is also known as "3GPP TS 26.290 V6.3.0 (2005 June)—Technical Specification".

Further, EP 1 395 980 B1 describes an audio coding concept. The publication describes a means by which selected frequency bands of information from an original audio signal, which are audible, but which are perceptionally less relevant, need not be encoded, but may be replaced by a noise filling parameter. Those signal bands having content, which is perceptionally more relevant are, in contrast, fully encoded. Encoding bits are saved in this manner without leaving voids in the frequency spectrum of the received signal. The noise filling parameter is a measure of the RMS signal value within the band in question and is used at the reception end by a decoding algorithm to indicate the amount of noise to inject in the frequency band in question.

Further approaches provide for a non-guided noise insertion in the decoder, taking into account the tonality of the transmitted spectrum.

However, the conventional concepts typically bring along the problem that they either comprise a poor resolution regarding the granularity of the noise filling, which typically degrades the hearing impression, or may use a comparatively large amount of noise filling side information, which entails extra bit rate.

In view of the above, there is the need for an improved concept of noise filling, which provides for an improved trade-off between the achievable hearing impression and the bit rate that may be used.

SUMMARY

According to an embodiment, a decoder for providing a decoded representation of an audio signal on the basis of an encoded audio stream representing spectral components of frequency bands of the audio signal may have: a noise filler configured to introduce noise into spectral components of a plurality of frequency bands, to which separate frequency band gain values are associated, on the basis of a common multi-band noise intensity value; and a scale factor gain determinator, which is configured to receive one integer representation of a scale factor per scale factor band and to provide one gain value per scale factor band; wherein the noise filler is configured to selectively modify a frequency band gain value of a given frequency band using a noise offset value if the given frequency band is quantized to zero.

According to another embodiment, a method for providing a decoded representation of an audio signal on the basis of an encoded audio stream representing spectral components of frequency bands of the audio signal may have the steps of: introducing noise into spectral components of a plurality of frequency bands, to which separate frequency band gain values are associated, on the basis of a common multi-band noise intensity value; and providing one gain value per scale factor band on the basis of one integer representation of a scale factor per scale factor band; wherein the method includes selectively modifying a frequency band gain value of a given frequency band using a noise offset value if the given frequency band is quantized to zero.

Another embodiment may have a non-transitory digital storage medium having a computer program stored thereon to perform the inventive method for providing a decoded representation of an audio signal on the basis of an encoded audio stream representing spectral components of frequency bands of the audio signal, when said computer program is run by a computer.

An embodiment according to the invention creates an encoder for providing an audio stream on the basis of a transform-domain representation of an input audio signal. The encoder comprises a quantization error calculator configured to determine a multi-band quantization error over a plurality of frequency bands (for example, over a plurality of scale factor bands) of the input audio signal, for which separate band gain information (for example, separate scale factors) is available. The encoder also comprises an audio stream provider configured to provide the audio stream such that the audio stream comprises an information describing an audio content of the frequency bands and an information describing the multi-band quantization error.

The above-described encoder is based on the finding that the usage of a multi-band quantization error information brings along the possibility to obtain a good hearing impression on the basis of a comparatively small amount of side information. In particular, the usage of a multi-band quantization error information, which covers a plurality of frequency bands for which separate band gain information is available, allows for a decoder-sided scaling of noise values, which are based on the multi-band quantization error, in dependence on the band gain information. Accordingly, as the band gain information is typically correlated with a psychoacoustic relevance of the frequency bands or with a quantization accuracy applied to the frequency bands, the multi-band quantization error information has been identified as a side information, which allows for a synthesis of filling noise providing a good hearing impression while keeping the bit rate-cost of the side information low.

In an advantageous embodiment, the encoder comprises a quantizer configured to quantize spectral components (for example, spectral coefficients) of different frequency bands of the transform domain representation using different quantization accuracies in dependence on psychoacoustic relevances of the different frequency bands to obtain quantized spectral components, wherein the different quantization accuracies are reflected by the band gain information. Also, the audio stream provider is configured to provide the audio stream such that the audio stream comprises an information describing the band gain information (for example, in the form of scale factors) and such that the audio stream also comprises the information describing the multi-band quantization error.

In an advantageous embodiment, the quantization error calculator is configured to determine the quantization error in the quantized domain, such that a scaling, in dependence on the band gain information of the spectral component, which is performed prior to an integer value quantization, is taken into consideration. By considering the quantization error in the quantized domain, the psychoacoustic relevance of the spectral bins is considered when calculating the multi-band quantization error. For example, for frequency bands of small perceptual relevance, the quantization may be coarse, such that the absolute quantization error (in the non-quantized domain) is large. In contrast, for spectral bands of high psychoacoustic relevance, the quantization is fine and the quantization error, in the non-quantized domain, is small. In order to make the quantization errors in the frequency bands of high psychoacoustic relevance and of low psychoacoustic relevance comparable, such as to obtain a meaningful multi-band quantization error information, the quantization error is calculated in the quantized domain (rather than in the non-quantized domain) in an advantageous embodiment.

In a further advantageous embodiment, the encoder is configured to set a band gain information (for example, a scale factor) of a frequency band, which is quantized to zero (for example, in that all spectral bins of the frequency band are quantized to zero) to a value representing a ratio between an energy of the frequency band quantized to zero and an energy of the multi-band quantization error. By setting a scale factor of a frequency band which is quantized to zero to a well-defined value, it is possible to fill the frequency band quantized to zero with a noise, such that the energy of the noise is at least approximately equal to the original signal energy of the frequency band quantized to zero. By adapting the scale factor in the encoder, a decoder can treat the frequency band quantized to zero in the same way as any other frequency bands not quantized to zero, such that there is no need for a complicated exception handling (typically requiring an additional signaling). Rather, by adapting the band gain information (e.g. scale factor), a combination of the band gain value and the multi-band quantization error information allows for a convenient determination of the filling noise.

In an advantageous embodiment, the quantization error calculator is configured to determine the multi-band quantization error over a plurality of frequency bands comprising at least one frequency component (e.g. frequency bin) quantized to a non-zero value while avoiding frequency bands entirely quantized to zero. It has been found that a multi-band quantization error information is particularly meaningful if frequency bands entirely quantized to zero are omitted from the calculation. In frequency bands entirely quantized to zero, the quantization is typically very coarse, so that the quantization error information obtained from such a frequency band is typically not particularly meaningful. Rather, the quantization error in the psychoacoustically more relevant frequency bands, which are not entirely quantized to zero, provides a more meaningful information, which allows for a noise filling adapted to the human hearing at the decoder side.

An embodiment according to the invention creates a decoder for providing a decoded representation of an audio signal on the basis of an encoded stream representing spectral components of frequency bands of the audio signal. The decoder comprises a noise filler configured to introduce noise into spectral components (for example, spectral line values or, more generally, spectral bin values) of a plurality of frequency bands to which separate frequency band gain information (for example, scale factors) is associated on the basis of a common multi-band noise intensity value.

The decoder is based on the finding that a single multi-band noise intensity value can be applied for a noise filling with good results if separate frequency band gain information is associated with the different frequency bands.

Accordingly, an individual scaling of noise introduced in the different frequency bands is possible on the basis of the frequency band gain information, such that, for example, the single common multi-band noise intensity value provides, when taken in combination with separate frequency band gain information, sufficient information to introduce noise in a way adapted to human psychoacoustics. Thus, the concept described herein allows to apply a noise filling in the quantized (but non-rescaled) domain. The noise added in the decoder can be scaled with the psychoacoustic relevance of the band without requiring additional side information (beyond the side information, which, anyway, may be used to scale the non-noise audio content of the frequency bands in accordance with the psychoacoustic relevance of the frequency bands).

In an advantageous embodiment, the noise filler is configured to selectively decide on a per-spectral-bin basis whether to introduce a noise into individual spectral bins of a frequency band in dependence on whether the respective individual spectral bins are quantized to zero or not. Accordingly, it is possible to obtain a very fine granularity of the noise filling while keeping the quantity of useful side information very small. Indeed, it is not required to transmit any frequency-band-specific noise filling side information, while still having an excellent granularity with respect to the noise filling. For example, it is typically useful to transmit a band gain factor (e.g. scale factor) for a frequency band even if only a single spectral line (or a single spectral bin) of said frequency band is quantized to a non-zero intensity value. Thus, it can be said that the scale factor information is available for noise filling at no extra cost (in terms of bitrate) if at least one spectral line (or a spectral bin) of the frequency band is quantized to a non-zero intensity. However, according to a finding of the present invention, it is not necessary to transport frequency-band-specific noise information in order to obtain an appropriate noise filling in such a frequency band in which at least one non-zero spectral bin intensity value exists. Rather, it has been found that psychoacoustically good results can be obtained by using the multi-band noise intensity value in combination with the frequency-band-specific frequency band gain information (e.g. scale factor). Thus, it is not necessary to waste bits on a frequency-band-specific noise filling information. Rather, the transmission of a single multi-band noise intensity value is sufficient, because this multi-band noise filling information can be combined with the frequency band gain information transmitted anyway to obtain frequency-band-specific noise filling information well adapted to the human hearing expectations.

In another advantageous embodiment, the noise filler is configured to receive a plurality of spectral bin values representing different overlapping or non-overlapping frequency portions of the first frequency band of a frequency domain audio signal representation, and to receive a plurality of spectral bin values representing different overlapping or non-overlapping frequency portions of the second frequency band of the frequency domain audio signal representation. Further, the noise filler is configured to replace one or more spectral bin values of the first frequency band of the plurality of frequency bands with a first spectral bin noise value, wherein a magnitude of the first spectral bin noise value is determined by the multi-band noise intensity value. In addition, the noise filler is configured to replace one or more spectral bin values of the second frequency band with a second spectral bin noise value having the same magnitude as the first spectral bin noise value. The decoder also comprises a scaler configured to scale spectral bin values of the first frequency band with the first frequency band gain value to obtain scaled spectral bin values of the first frequency band, and to scale spectral bin values of the second frequency band with a second frequency band gain value to obtain scaled spectral bin values of the second frequency band, such that the replaced spectral bin values, replaced with the first and second spectral bin noise values, are scaled with different frequency band gain values, and such that the replaced spectral bin value, replaced with the first spectral bin noise value, an un-replaced spectral bin values of the first frequency band representing an audio content of the first frequency band are scaled with the first frequency band gain value, and such that the replaced spectral bin value, replaced with the second spectral bin noise value, an un-replaced spectral bin values of the second frequency band representing an audio content of the second frequency band are scaled with the second frequency band gain value.

In an embodiment according to the invention, the noise filler is optionally configured to selectively modify a frequency band gain value of a given frequency band using a noise offset value if the given frequency band is quantized to zero. Accordingly, the noise offset serves for minimizing a number of side information bits. Regarding this minimization, it should be noted that the encoding of the scale factors (scf) in an AAC audio coder is performed using a Huffmann encoding of the difference of subsequent scale factors (scf). Small differences obtain the shortest codes (while larger differences obtain larger codes). The noise offset minimizes the "mean difference" at a transition from conventional scale factors (scale factors of bands not quantized to zero) to noise scale factors and back, and thus optimizes the bit demand for the side information. This is due to the fact that normally the "noise scale factors" are larger than the conventional scale factors, as the included lines are not >=1, but correspond to the mean quantization error e (wherein typically 0<e<0.5).

In an advantageous embodiment, the noise filler is configured to replace spectral bin values of the spectral bins quantized to zero with spectral bin noise values, magnitudes of which spectral bin noise values are dependent on the multi-band noise intensity value, to obtain replaced spectral bin values, only for frequency bands having a lowest spectral bin coefficient above a predetermined spectral bin index, leaving spectral bin values of frequency bands having a lowest spectral bin coefficient below the predetermined spectral bin index unaffected. In addition, the noise filler is advantageously configured to selectively modify, for frequency bands having a lowest spectral bin coefficient above the predetermined spectral bin index, a band gain value (e.g. a scale factor value) for a given frequency band in dependence on a noise offset value, if the given frequency band is entirely quantized to zero. Advantageously, the noise filling is only performed above the predetermined spectral bin index. Also, the noise offset is advantageously only applied to bands quantized to zero and is advantageously not applied below the predetermined spectral bin index. Moreover, the decoder advantageously comprises a scaler configured to apply the selectively modified or unmodified band gain values to the selectively replaced or un-replaced spectral bin values, to obtain scaled spectral information, which represents the audio signal. Using this approach, the decoder reaches a very balanced hearing impression, which is not severely degraded by the noise filling. Noise filling is only applied to the upper frequency bands (having a lowest spectral bin coefficients above a predetermined spectral bin index), because a noise filling in the lower frequency bands would bring along an undesirable degradation of the hearing impressions. On the other hand, it is advantageous to perform the noise filling in the upper frequency bands. It should be noted that in some cases the lower scale factor bands (sfb) are quantized finer (than the upper scale factor bands).

Another embodiment according to the invention creates a method for providing an audio stream on the basis of a transform-domain representation of the input audio signal.

Another embodiment according to the invention creates a method for providing a decoded representation of an audio signal on the basis of an encoded audio stream.

A further embodiment according to the invention creates a computer program for performing one or more of the methods mentioned above.

A further embodiment according to the invention creates an audio stream representing the audio signal. The audio stream comprises spectral information describing intensities of spectral components of the audio signal, wherein the spectral information is quantized with different quantization accuracies in different frequency bands. The audio stream also comprises a noise level information describing a multi-band quantization error over a plurality of frequency bands, taking into account different quantization accuracies. As explained above, such an audio stream allows for an efficient decoding of the audio content, wherein a good trade-off between an achievable hearing impression and a useful bit rate is obtained.

BRIEF DESCRIPTION OF THE DRAWINGS

Embodiments of the present invention will be detailed subsequently referring to the appended drawings, in which:

FIGS. 4*a*-4*b* show pseudo code program listings of algorithms executed for the encoding of an audio signal;

FIG. 10*a* shows a pseudo program code representation of an algorithm, which may be executed by the noise filler shown in FIG. 7 or by the noise filler shown in FIG. 9;

FIG. 10*b* shows a legend of elements of the pseudo program code of FIG. 10*a;*

FIGS. 13*a*-13*b* show pseudo program code representations of algorithms, which may be performed by the noise filler of FIG. 7 or by the noise filler of FIG. 9;

FIGS. 14*a* to 14*d* show representations of bit stream elements of an audio stream according to an embodiment of the invention; and FIG. 15 shows a graphical representation of a bit stream according to another embodiment of the invention.

DETAILED DESCRIPTION

1 Encoder 1.1. Encoder According to FIG. 1

Figure 1:
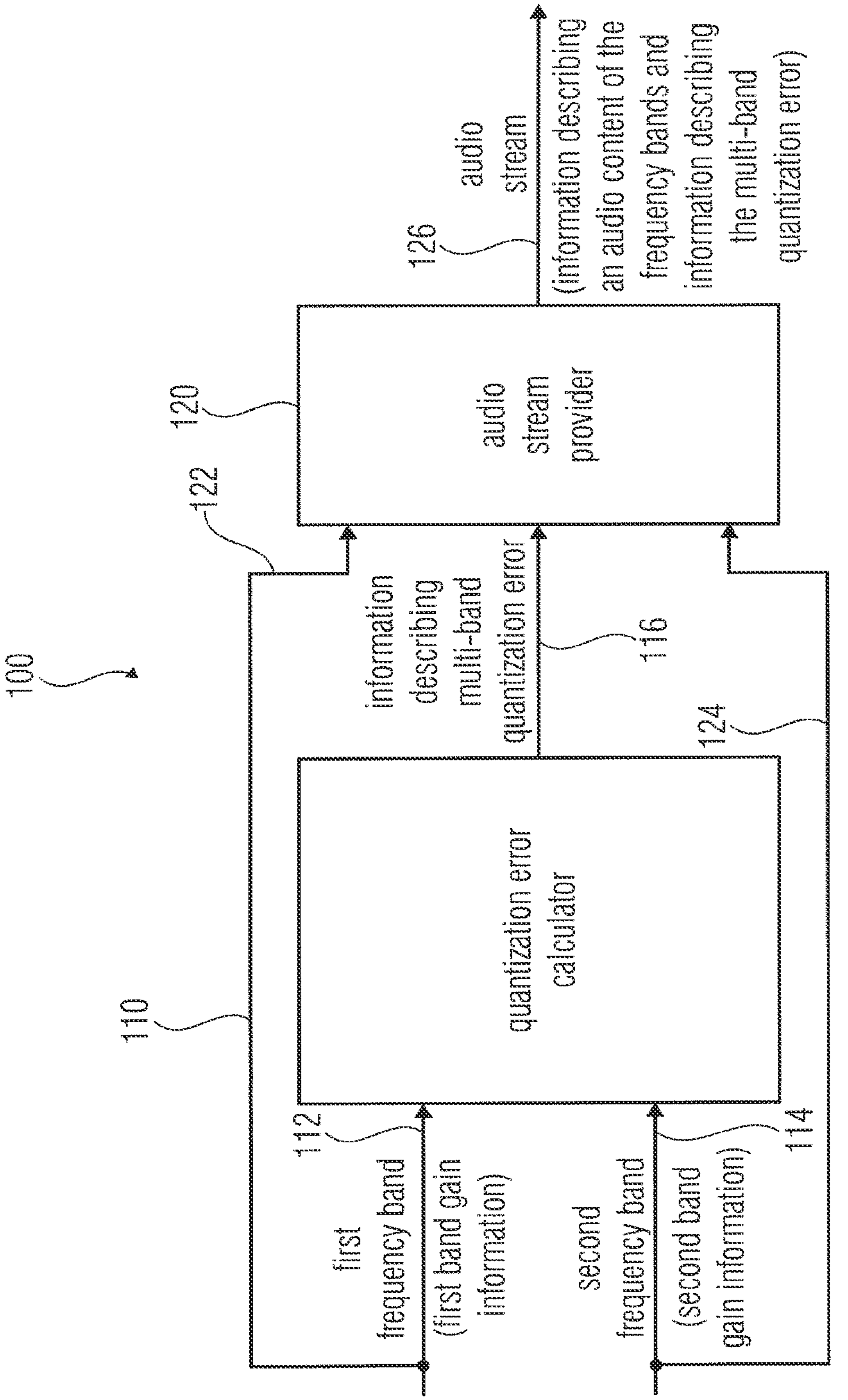
FIG. 1 shows a block schematic diagram of an encoder according to an embodiment of the invention.

FIG. 1 shows a block schematic diagram of an encoder for providing an audio stream on the basis of the transform-domain representation of an input audio signal according to an embodiment of the invention.

The encoder 100 of FIG. 1 comprises a quantization error calculator 110 and an audio stream provider 120. The quantization error calculator 110 is configured to receive an information 112 regarding a first frequency band, for which a first frequency band gain information is available, and an information 114 about a second frequency band, for which a second frequency band gain information is available. The quantization error calculator is configured to determine a multi-band quantization error over a plurality of frequency bands of the input audio signal, for which separate band gain information is available. For example, the quantization error calculator 110 is configured to determine the multi-band quantization error over the first frequency band and the second frequency band using the information 112, 114. Accordingly, the quantization error calculator 110 is configured to provide the information 116 describing the multi-band quantization error to the audio stream provider 120. The audio stream provider 120 is configured to also receive an information 122 describing the first frequency band and an information 124 describing the second frequency band. In addition, the audio stream provider 120 is configured to provide an audio stream 126, such that the audio stream 126 comprises a representation of the information 116 and also a representation of the audio content of the first frequency band and of the second frequency band.

Accordingly, the encoder 100 provides an audio stream 126, comprising an information content, which allows for an efficient decoding of the audio content of the frequency band using a noise filling. In particular, the audio stream 126 provided by the encoder brings along a good trade-off between bit rate and noise-filling-decoding-flexibility.

1.2. Encoder According to FIG. 2

1.2.1. Encoder Overview

In the following, an improved audio coder according to an embodiment of the invention will be described, which is based on the audio encoder described in the International Standard ISO/IEC 14496-3: 2005(E), Information Technology—Coding of Audio-Visual Objects—Part 3: Audio, Subpart 4: General Audio Coding (GA)—AAC, Twin VQ, BSAC.

Figure 2:
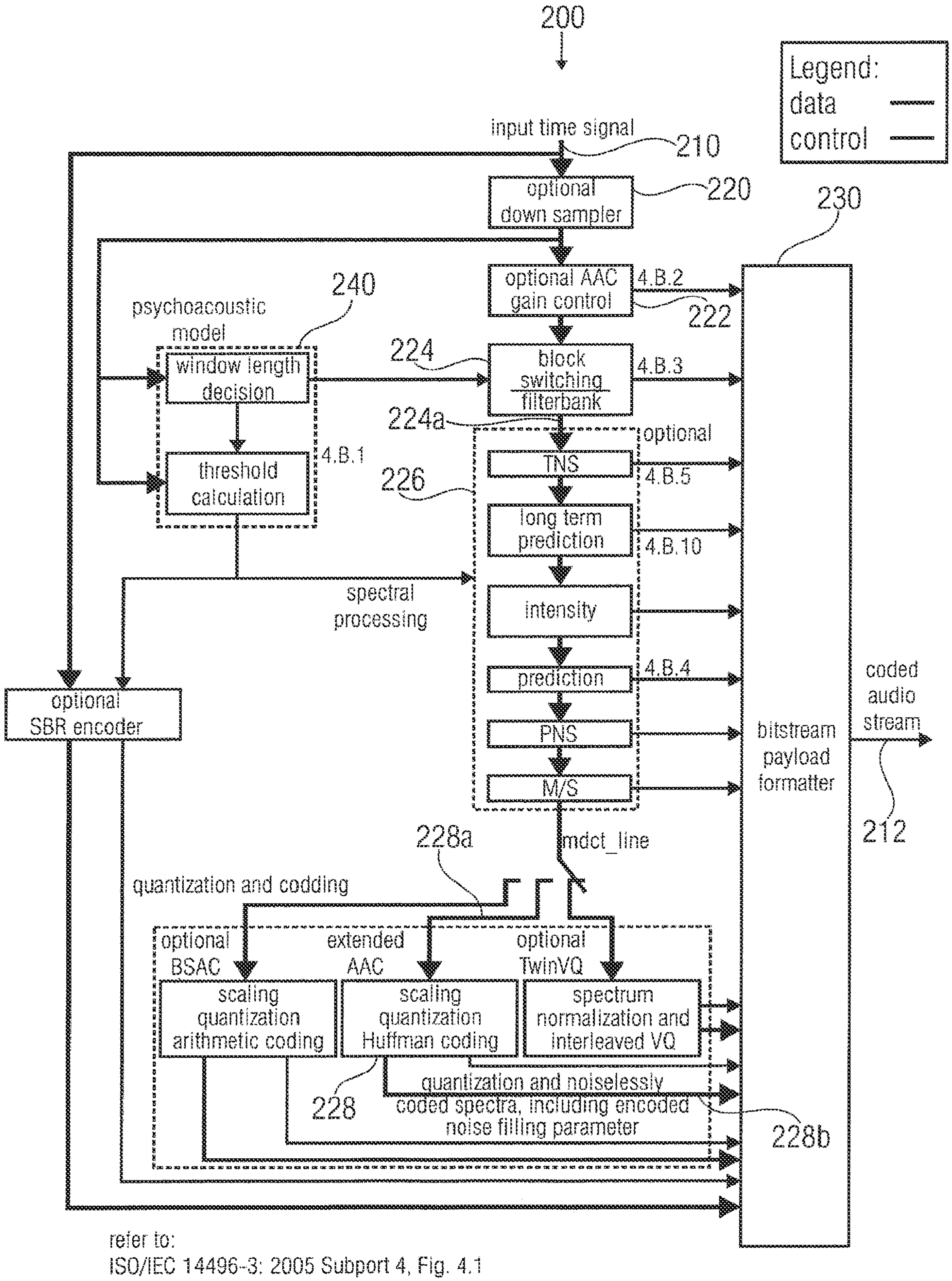
FIG. 2 shows a block schematic diagram of an encoder according to another embodiment of the invention.

The audio encoder 200 according to FIG. 2 is specifically based on the audio encoder described in ISO/IEC 14496-3: 2005(E), Part 3: Audio, Sub-part 4, Section 4.1. However, the audio encoder 200 does not need to implement the exact functionality of the audio encoder of ISO/IEC 14494-3: 2005(E).

The audio encoder 200 may, for example, be configured to receive an input time signal 210 and to provide, on the basis thereof, a coded audio stream 212. A signal processing path may comprise an optional downsampler 220, an optional AAC gain control 222, a block-switching filterbank 224, an optional signal processing 226, an extended AAC encoder 228 and a bit stream payload formatter 230. However, the encoder 200 typically comprises a psychoacoustic model 240.

In a very simple case, the encoder 200 only comprises the blockswitching/filter bank 224, the extended AAC encoder 228, the bit stream payload formatter 230 and the psychoacoustic model 240, while the other components (in particular, components 220, 222, 226) should be considered as merely optional.

In a simple case, the block-switching/filter bank 224, receives the input time signal 210 (optionally downsampled by the downsampler 220, and optionally scaled in gain by the AAC gain controller 222), and provides, on the basis thereof, a frequency domain representation 224*a*. The frequency domain representation 224*a* may, for example, comprise an information describing intensities (for example, amplitudes or energies) of spectral bins of the input time signal 210. For example, the block-switching/filter bank 224, may be configured to perform a modified discrete cosine transform (MDCT) to derive the frequency domain values from the input time signal 210. The frequency domain representation 224*a* may be logically split in different frequency bands, which are also designated as "scale factor bands". For example, it is assumed that the block-switching/filter bank 224, provides spectral values (also designated as frequency bin values) for a large number of different frequency bins. The number of frequency bins is determined, among others, by the length of a window input into the filterbank 224, and also dependent on the sampling (and bit) rate. However, the frequency bands or scale factor bands define sub-sets of the spectral values provided by the block-switching/filterbank. Details regarding the definition of the scale factor bands are known to the man skilled in the art, and also described in ISO/IEC 14496-3: 2005(E), Part 3, Sub-part 4.

The extended AAC encoder 228 receives the spectral values 224*a* provided by the block-switching/filterbank 224 on the basis of the input time signal 210 (or a pre-processed version thereof) as an input information 228*a*. As can be seen from FIG. 2, the input information 228*a* of the extended AAC encoder 228 may be derived from the spectral values 224*a* using one or more of the processing steps of the optional spectral processing 226. For details regarding the optional pre-processing steps of the spectral processing 226, reference is made to ISO/IEC 14496-3: 2005(E), and to further Standards referenced therein.

The extended AAC encoder 228 is configured to receive the input information 228*a* in the form of spectral values for a plurality of spectral bins and to provide, on the basis thereof, a quantized and noiselessly coded representation 228*b* of the spectrum. For this purpose, the extended AAC encoder 228 may, for example, use information derived from the input audio signal 210 (or a pre-processed version thereof) using the psychoacoustic model 240. Generally speaking, the extended AAC encoder 228 may use an information provided by the psychoacoustic model 240 to decide which accuracy should be applied for the encoding of different frequency bands (or scale factor bands) of the spectral input information 228*a*. Thus, the extended AAC encoder 228 may generally adapt its quantization accuracy for different frequency bands to the specific characteristics of the input time signal 210, and also to the available number of bits. Thus, the extended AAC encoder may, for example, adjust its quantization accuracies, such that the information representing the quantized and noiselessly coded spectrum comprises an appropriate bit rate (or average bit rate).

The bit stream payload formatter 230 is configured to include the information 228*b* representing the quantized and noiselessly coded spectra into the coded audio stream 212 according to a predetermined syntax.

For further details regarding the functionality of the encoder components described here, reference is made to ISO/IEC 14496-3: 2005(E) (including annex 4.B thereof), and also to ISO/IEC 13818-7: 2003.

Further, reference is made to ISO/IEC 13818-7: 2005, Sub-clauses C1 to C9.

Furthermore, specific reference regarding the terminology is made to ISO/IEC 14496-3: 2005(E), Part 3: Audio, Sub-part 1: Main.

In addition, specific reference is made to ISO/IEC 14496-3: 2005(E), Part 3: Audio, Sub-part 4: General Audio Coding (GA)—AAC, Twin VQ, BSAC.

1.2.2. Encoder Details

In the following, details regarding the encoder will be described taking reference to FIGS. 3*a*, 3*b*, 4*a* and 4*b*.

Figure 3A:
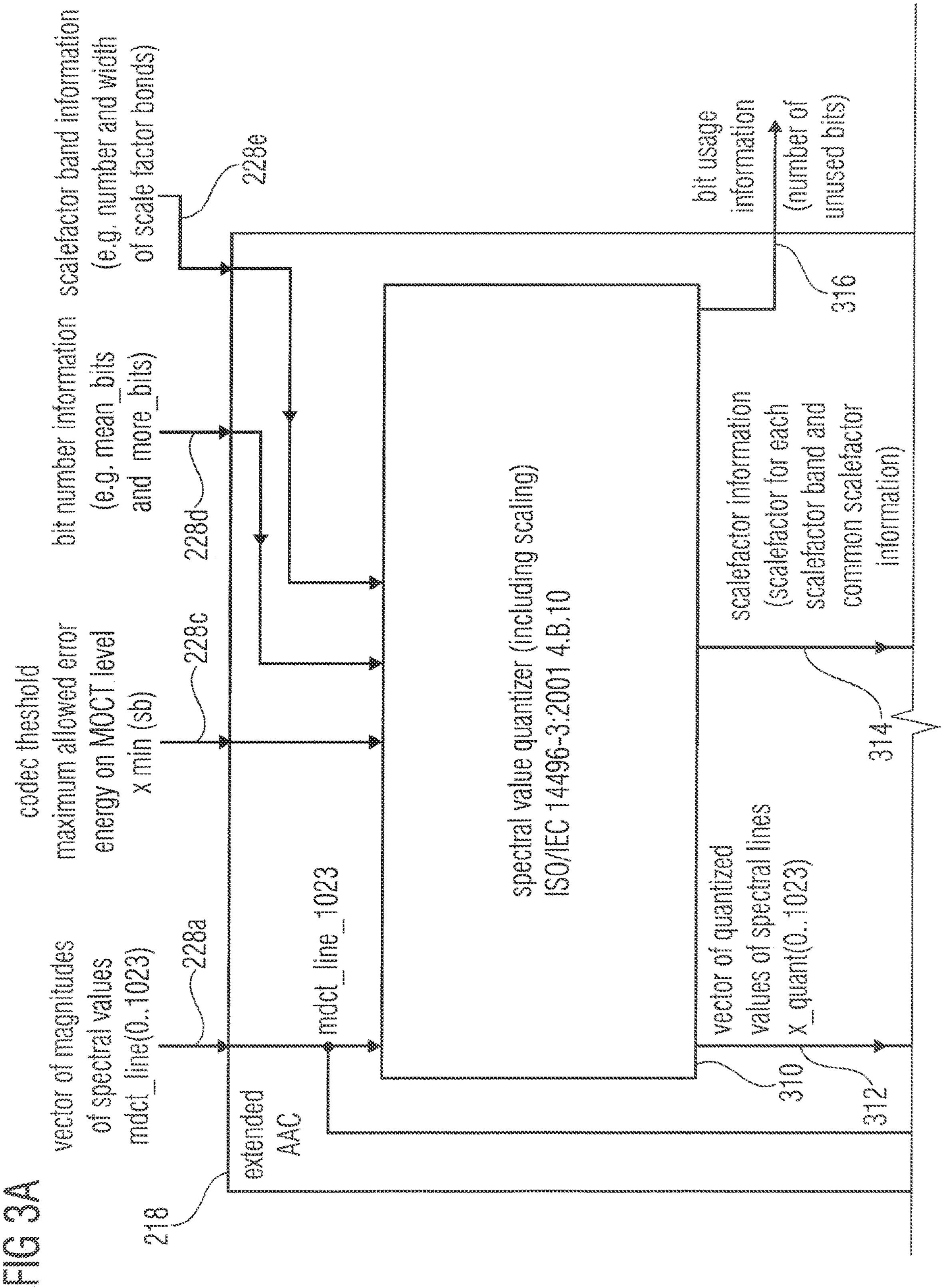
FIGS. 3*a*-3*b* show a block schematic diagram of an extended advanced audio coding (AAC) according to an embodiment of the invention.
Figure 3A:
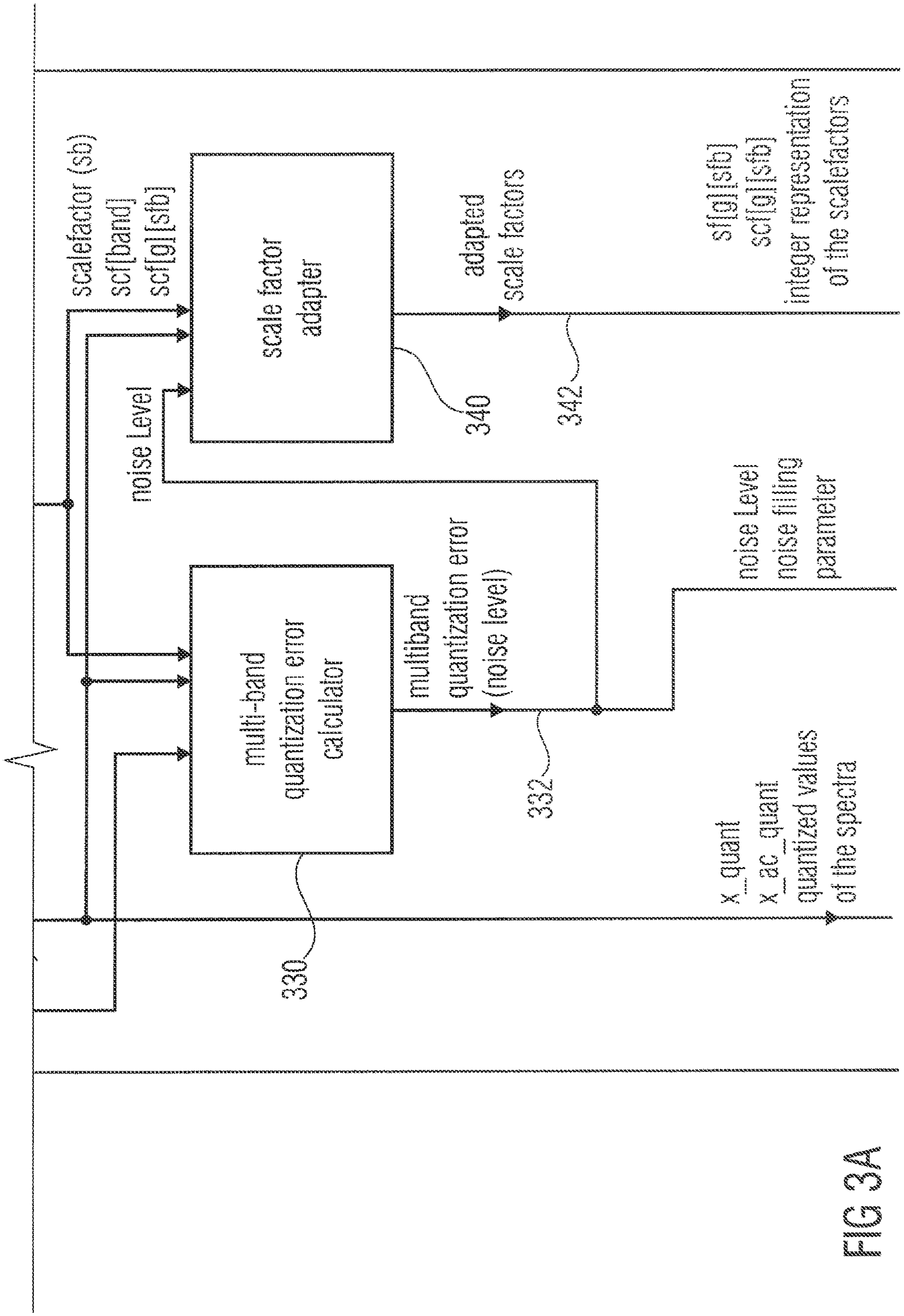
Figure 3B:
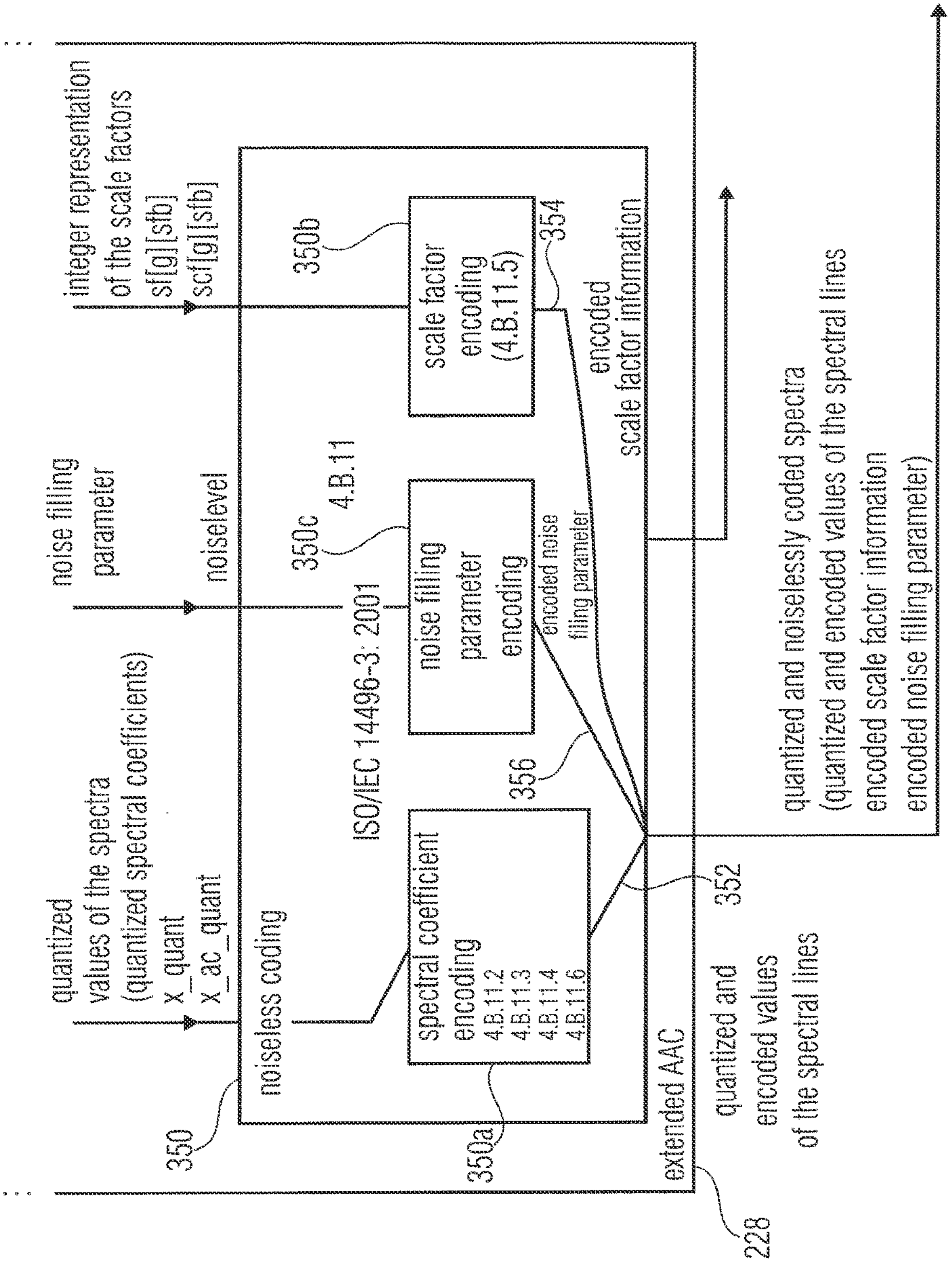

FIGS. 3*a* and 3*b* show a block schematic diagram of an extended AAC encoder according to an embodiment of the invention. The extended AAC decoder is designated with 228 and can take the place of the extended AAC encoder 228 of FIG. 2. The extended AAC encoder 228 is configured to receive, as an input information 228*a*, a vector of magnitudes of spectral lines, wherein the vector of spectral lines is sometimes designated with mdct_line (0 . . . 1023). The extended AAC encoder 228 also receives a codec threshold information 228*c*, which describes a maximum allowed error energy on a MDCT level. The codec threshold information 228*c* is typically provided individually for different scale factor bands and is generated using the psychoacoustic model 240. The codec threshold information 228 is sometimes designated with $x_{min}$ (sb), wherein the parameter sb indicates the scale factor band dependency. The extended AAC encoder 228 also receives a bit number information 228*d*, which describes a number of available bits for encoding the spectrum represented by the vector 228*a* of magnitudes of spectral values. For example, the bit number information 228*d* may comprise a mean bit information (designated with mean_bits) and an additional bit information (designated with more_bits). The extended AAC encoder 228 is also configured to receive a scale factor band information 228*e*, which describes, for example, a number and width of scale factor bands.

The extended AAC encoder comprises a spectral value quantizer 310, which is configured to provide a vector 312 of quantized values of spectral lines, which is also designated with x_quant (0 . . . 1023). The spectral value quantizer 310, which includes a scaling, is also configured to provide a scale factor information 314, which may represent one scale factor for each scale factor band and also a common scale factor information. Further, the spectral value quantizer 310 may be configured to provide a bit usage information 316, which may describe a number of bits used for quantizing the vector 228*a* of magnitudes of spectral values. Indeed, the spectral value quantizer 310 is configured to quantize different spectral values of the vector 228*a* with different accuracies depending on the psychoacoustic relevance of the different spectral values. For this purpose, the spectral value quantizer 210 scales the spectral values of the vector 228*a* using different, scale-factor-band-dependent scale factors and quantizes the resulting scaled spectral values. Typically, spectral values associated with psychoacoustically important scale factor bands will be scaled with large scale factors, such that the scaled spectral values of psychoacoustically important scale factor bands cover a large range of values. In contrast, the spectral values of psychoacoustically less important scale factor bands are scaled with smaller scale factors, such that the scaled spectral values of the psychoacoustically less important scale factor bands cover a smaller range of values only. The scaled spectral values are then quantized, for example, to an integral value. In this quantization, many of the scaled spectral values of the psychoacoustically less important scale factor bands are quantized to zero, because the spectral values of the psychoacoustically less important scale factor bands are scaled with a small scale factor only.

As a result, it can be said that spectral values of psychoacoustically more relevant scale factor bands are quantized with high accuracy (because the scaled spectral lines of said more relevant scale factor bands cover a large range of values and, therefore, many quantization steps), while the spectral values of the psychoacoustically less important scale factor bands are quantized with lower quantization accuracy (because the scaled spectral values of the less important scale factor bands cover a smaller range of values and are, therefore, quantized to less different quantization steps).

The spectral value quantizer 310 is typically configured to determine appropriate scaling factors using the codec threshold 228*c* and the bit number information 228*d*. Typically, the spectral value quantizer 310 is also configured to determine the appropriate scale factors by itself. Details regarding a possible implementation of the spectral value quantizer 310 are described in ISO/IEC 14496-3: 2001, Chapter 4.13.10. In addition, the implementation of the spectral value quantizer is well known to a man skilled in the art of MPEG4 encoding.

The extended AAC encoder 228 also comprises a multi-band quantization error calculator 330, which is configured to receive, for example, the vector 228*a* of magnitudes of spectral values, the vector 312 of quantized-values of spectral lines and the scale factor information 314. The multi-band quantization error calculator 330 is, for example, configured to determine a deviation between a non-quantized scaled version of the spectral values of the vector 228*a* (for example, scaled using a non-linear scaling operation and a scale factor) and a scaled-and-quantized version (for example, scaled using a non-linear scaling operation and a scale factor, and quantized using an "integer" rounding operation) of the spectral values. In addition, the multi-band quantization error calculator 330 may be configured to calculate an average quantization error over a plurality of scale factor bands. It should be noted that the multi-band quantization error calculator 330 advantageously calculates the multi-band quantization error in a quantized domain (more precisely in a psychoacoustically scaled domain), such that a quantization error in psychoacoustically relevant scale factor bands is emphasized in weight when compared to a quantization error in psychoacoustically less relevant scale factor bands. Details regarding the operation of the multi-band quantization error calculator will subsequently be described taking reference to FIGS. 4*a* and 4*b*.

The extended AAC encoder 328 also comprises a scale factor adaptor 340, which is configured to receive the vector 312 of quantized values, the scale factor information 314 and also the multi-band quantization error information 332, provided by the multi-band quantization error calculator 340. The scale factor adaptor 340 is configured to identify scale factor bands, which are "quantized to zero", i.e. scale factor bands for which all the spectral values (or spectral lines) are quantized to zero. For such scale factor bands quantized entirely to zero, the scale factor adaptor 340 adapts the respective scale factor. For example, the scale factor adaptor 340 may set the scale factor of a scale factor band quantized entirely to zero to a value, which represents a ratio between a residual energy (before quantization) of the respective scale factor band and an energy of the multi-band quantization error 332. Accordingly, the scale factor adaptor 340 provides adapted scale factors 342. It should be noted that both the scale factors provided by the spectral value quantizer 310 and the adapted scale factors provided by the scale factor adaptor are designated with "scale factor (sb)", "scf[band]", "sf[g][sfb]", "scf[g][sfb]" in the literature and also within this application. Details regarding the operation of the scale factor adaptor 340 will subsequently be described taking reference to FIGS. 4*a* and 4*b*.

The extended AAC encoder 228 also comprises a noiseless coding 350, which is, for example, explained in ISO/IEC 14496-3: 2001, Chapter 4.6.11. In brief, the noiseless coding 350 receives the vector of quantized values of spectral lines (also designated as "quantized values of the spectra") 312, the integer representation 342 of the scale factors (either as provided by the spectral value quantizer 310, or as adapted by the scale factor adaptor 340), and also a noise filling parameter 332 (for example, in the form of a noise level information) provided by the multi-band quantization error calculator 330.

The noiseless coding 350 comprises a spectral coefficient encoding 350*a* to encode the quantized values 312 of the spectral lines, and to provide quantized and encoded values 352 of the spectral lines. Details regarding the spectral coefficient encoding are, for example, described in sections 4.6.11.2, 4.6.11.3, 4.6.11.4 and 4.6.11.6 of ISO/IEC 14496-3: 2001. The noiseless coding 350 also comprises a scale factor encoding 350*b* for encoding the integer representation 342 of the scale factor to obtain an encoded scale factor information 354. The noiseless coding 350 also comprises a noise filling parameter encoding 350*c* to encode the one or more noise filling parameters 332, to obtain one or more encoded noise filling parameters 356. Consequently, the extended AAC encoder provides an information describing the quantized as noiselessly encoded spectra, wherein this information comprises quantized and encoded values of the spectral lines, encoded scale factor information and encoded noise filling parameter information.

In the following, the functionality of the multi-band quantization error calculator 330 and of the scale factor adaptor 340, which are key components of the inventive extended AAC encoder 228 will be described, taking reference to FIGS. 4*a* and 4*b*. For this purpose, FIG. 4*a* shows a program listing of an algorithm performed by the multi-band quantization error calculator 330 and the scale factor adaptor 340.

A first part of the algorithm, represented by lines 1 to 12 of the pseudo code of FIG. 4*a*, comprises a calculation of a mean quantization error, which is performed by the multi-band quantization error calculator 330. The calculation of the mean quantization error is performed, for example, over all scale factor bands, except for those which are quantized to zero. If a scale factor band is entirely quantized to zero (i.e. all spectral lines of the scale factor band are quantized to zero), said scale factor band is skipped for the calculation of the mean quantization error. If, however, a scale factor band is not entirely quantized to zero (i.e. comprises at least one spectral line, which is not quantized to zero), all the spectral lines of said scale factor band are considered for the calculation of the mean quantization error. The mean quantization error is calculated in a quantized domain (or, more precisely, in a scaled domain). The calculation of a contribution to the average error can be seen in line 7 of the pseudo code of FIG. 4*a*. In particular, line 7 shows the contribution of a single spectral line to the average error, wherein the averaging is performed over all the spectral lines (wherein nLines indicates the number of total considered lines).

As can be seen in line 7 of the pseudo code, the contribution of a spectral line to the average error is the absolute value ("fabs"—operator) of a difference between a non-quantized, scaled spectral line magnitude value and a quantized, scaled spectral line magnitude value. In the non-quantized, scaled spectral line magnitude value, the magnitude value "line" (which may be equal to mdct_line) is non-linearly scaled using a power function (pow(line, 0.75)=$\text{line}^{0.75}$) and using a scale factor (e.g. a scale factor 314 provided by the spectral value quantizer 310). In the calculation of the quantized, scaled spectral line magnitude value, the spectral line magnitude value "line" may be non-linearly scaled using the above-mentioned power functions and scaled using the above-mentioned scale factor. The result of this non-linear and linear scaling may be quantized using an integer operator "(INT)". Using the calculation as indicated in line 7 of the pseudo code, the different impact of the quantization on the psychoacoustically more important and the psychoacoustically less important frequency bands is considered.

Following the calculation of the (average) multi-band quantization error (avgError), the average quantization error may optionally be quantized, as shown in lines 13 and 14 of the pseudo code. It should be noted that the quantization of the multi-band quantization error as shown here is specifically adapted to the expected range of values and statistical characteristics of the quantization error, such that the quantization error can be represented in a bit-efficient way. However, other quantizations of the multi-band quantization error can be applied.

A third part of the algorithm, which is represented in lines 15 to 25, may be executed by the scale factor adaptor 340. The third part of the algorithm serves to set scale factors of scale factor frequency bands, which have been entirely quantized to zero, to a well-defined value, which allows for a simple noise filling, which brings along a good hearing impression. The third part of the algorithm optionally comprises an inverse quantization of the noise level (e.g. represented by the multi-band quantization error 332). The third part of the algorithm also comprises a calculation of a replacement scale factor value for scale factor bands quantized to zero (while scale factors of scale factor bands not quantized to zero will be left unaffected). For example, the replacement scale factor value for a certain scale factor band ("band") is calculated using the equation shown in line 20 of the algorithm of FIG. 4*a*. In this equation, "(INT)" represents an integer operator, "2.f" represents the number "2" in a floating point representation, "log" designates a logarithm operator, "energy" designates an energy of the scale factor band under consideration (before quantization), "(float)" designates a floating point operator, "sfbWidth" designates a width of the certain scale factor band in terms of spectral lines (or spectral bins), and "noiseVal" designates a noise value describing the multi-band quantization error. Consequently, the replacement scale factor describes a ratio between an average per-frequency-bin energy (energy/sfbWidth) of the certain scale factor bands under consideration, and an energy ($\text{noiseVal}^2$) of the multi-band quantization error.

1.2.3. Encoder Conclusion

Embodiments according to the invention create an encoder having a new type of noise level calculation. The noise level is calculated in the quantized domain based on the average quantization error.

Calculating the quantization error in the quantized domain brings along significant advantages, for example, because the psychoacoustic relevance of different frequency bands (scale factor bands) is considered. The quantization error per line (i.e. per spectral line, or spectral bin) in the quantized domain is typically in the range [−0.5; 0.5] (1 quantization level) with an average absolute error of 0.25 (for normal distributed input values that are usually larger than 1). Using an encoder, which provides information about a multi-band quantization error, the advantages of noise filling in the quantized domain can be exploited in an encoder, as will subsequently be described.

Noise level calculation and noise substitution detection in the encoder may comprise the following steps:

- Detect and mark spectral bands that can be reproduced perceptually equivalent in the decoder by noise substitution. For example, a tonality or a spectral flatness measure may be checked for this purpose;
- Calculate and quantize the mean quantization error (which may be calculated over all scale factor bands not quantized to zero); and
- Calculate scale factor (scf) for band quantized to zero such that the (decoder) introduced noise matches the original energy.

An appropriate noise level quantization may help to produce the number of bits that may be used for transporting the information describing the multi-band quantization error. For example, the noise level may be quantized in 8 quantization levels in the logarithmic domain, taking into account human perception of loudness. For instance, the algorithm shown in FIG. 4*b* may be used, wherein "(INT)" designates an integer operator, wherein "LD" designates a logarithm operation for a base of 2, and wherein "meanLineError" designates a quantization error per frequency line. "min(.,.)" designates a minimum value operator, and "max(.,.)" designates a maximum value operator.

2. Decoder 2.1. Decoder According to FIG. 5

Figure 5:
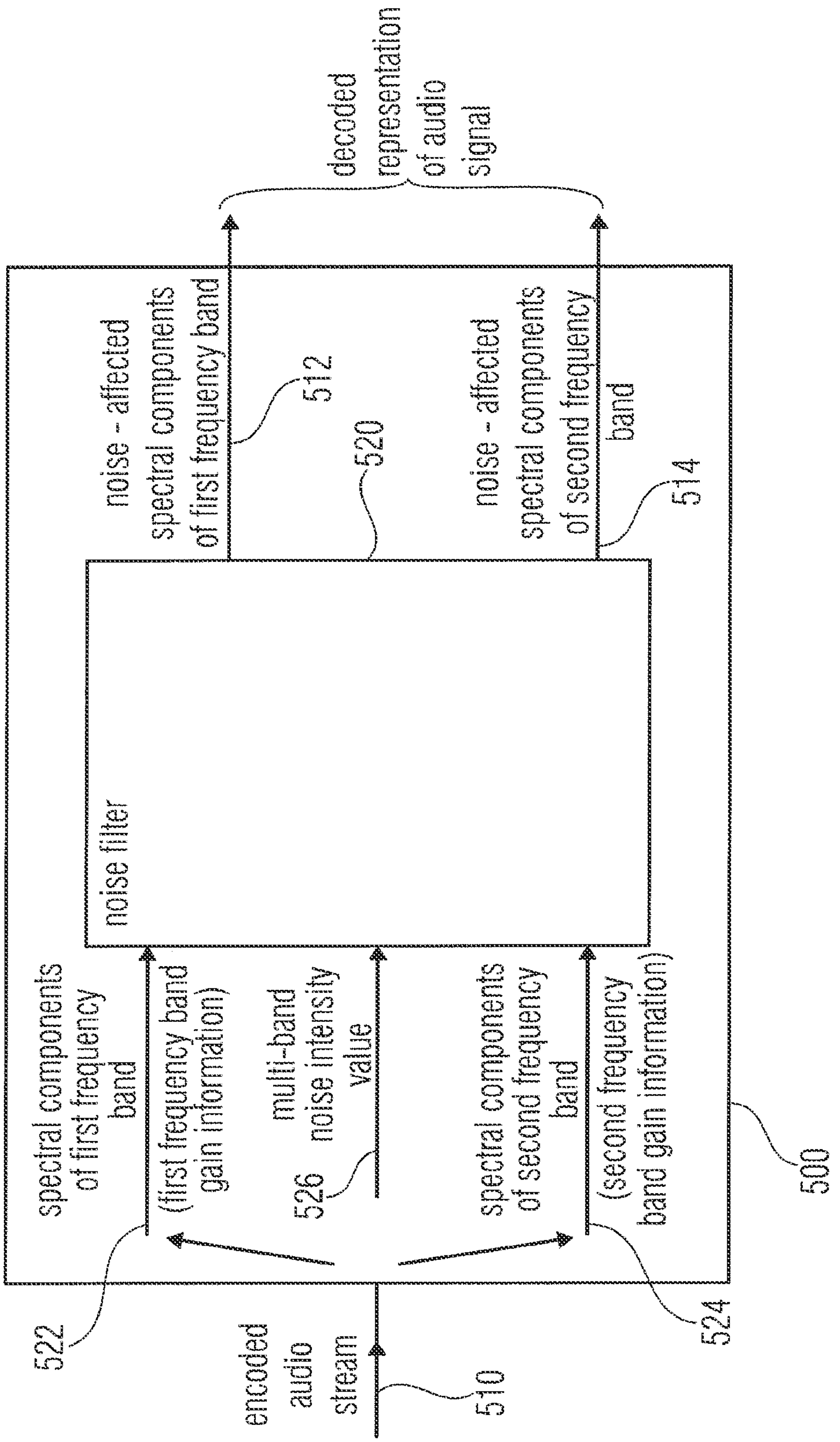
FIG. 5 shows a block schematic diagram of a decoder according to an embodiment of the invention.

FIG. 5 shows a block schematic diagram of a decoder according to an embodiment of the invention. The decoder 500 is configured to receive an encoded audio information, for example, in the form of an encoded audio stream 510, and to provide, on the basis thereof, a decoded representation of the audio signal, for example, on the basis of spectral components 522 of a first frequency band and spectral components 524 of a second frequency band. The decoder 500 comprises a noise filler 520, which is configured to receive a representation 522 of spectral components of a first frequency band, to which first frequency band gain information is associated, and a representation 524 of spectral components of a second frequency band, to which second frequency band gain information is associated. Further, the noise filler 520 is configured to receive a representation 526 of a multi-band noise intensity value. Further, the noise filler is configured to introduce noise into spectral components (e.g. into spectral line values or spectral bin values) of a plurality of frequency bands to which separate frequency band gain information (for example in the form of scale factors) is associated on the basis of the common multi-band noise intensity value 526. For example, the noise filler 520 may be configured to introduce noise into the spectral components 522 of the first frequency band to obtain the noise-affected spectral components 512 of the first frequency band, and also to introduce noise into the spectral components 524 of the second frequency band to obtain the noise-affected spectral components 514 of the second frequency band.

By applying noise described by a single multi-band noise intensity value 526 to spectral components of different frequency bands to which different frequency band gain information is associated, noise can be introduced into the different frequency bands in a very fine-tuned way, taking into account the different psychoacoustic relevance of a different frequency bands, which is expressed by the frequency band gain information. Thus, the decoder 500 is able to perform a time-tuned noise filling on the basis of a very small (bit-efficient) noise filling side information.

2.2. Decoder According to FIG. 6

2.2.1. Decoder Overview

Figure 6:
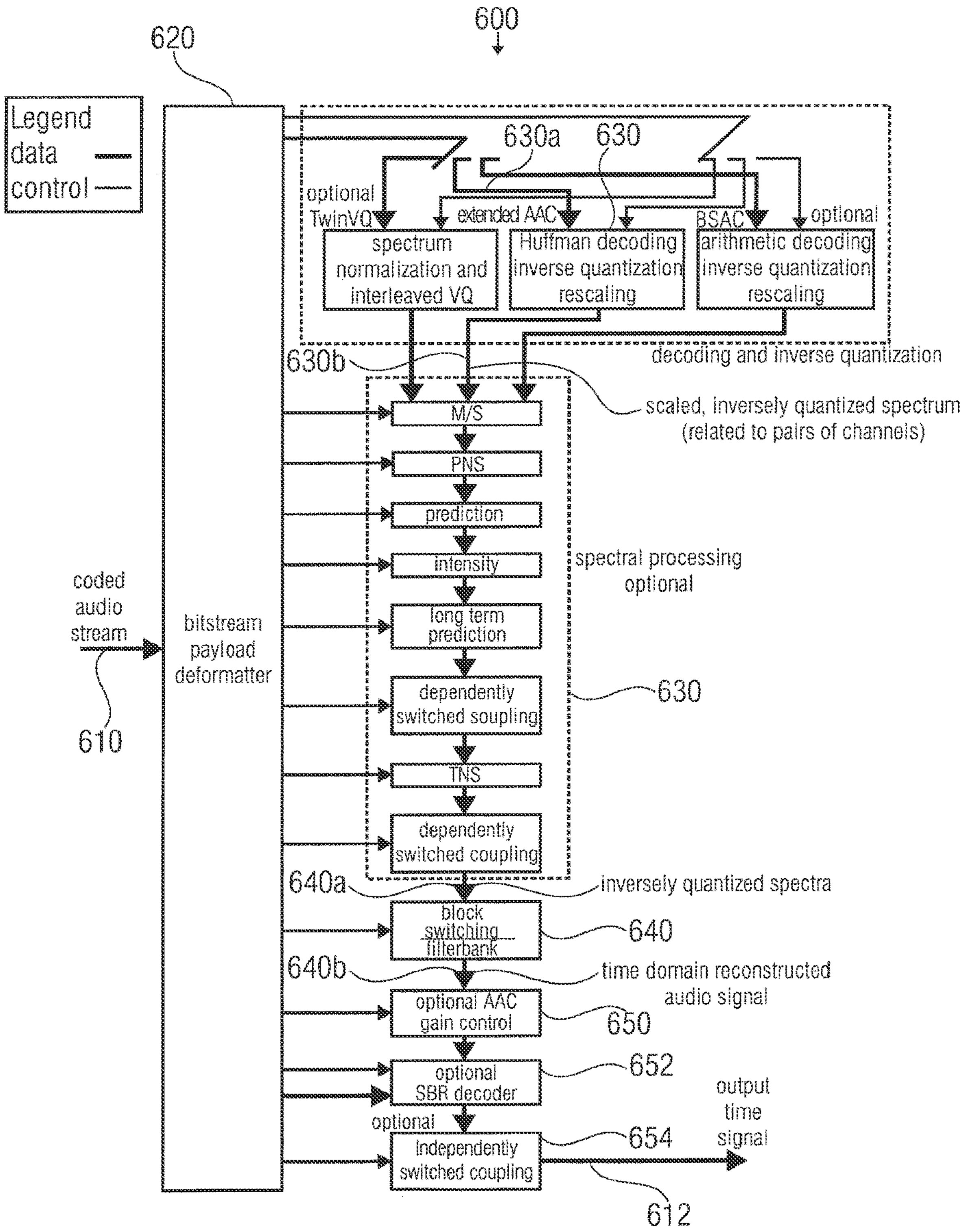
FIG. 6 shows a block schematic diagram of a decoder according to another embodiment of the invention.

FIG. 6 shows a block schematic diagram of a decoder 600 according to an embodiment of the invention.

The decoder 600 is similar to the decoder disclosed in ISO/IEC 14496.3: 2005 (E), such that reference is made to this International Standard. The decoder 600 is configured to receive a coded audio stream 610 and to provide, on the basis thereof, output time signals 612. The coded audio stream may comprise some or all of the information described in ISO/IEC 14496.3: 2005 (E), and additionally comprises information describing a multi-band noise intensity value. The decoder 600 further comprises a bitstream payload deformatter 620, which is configured to extract from the coded audio stream 610 a plurality of encoded audio parameters, some of which will be explained in detail in the following. The decoder 600 further comprises an extended "advanced audio coding" (AAC) decoder 630, the functionality of which will be described in detail, taking reference to FIGS. 7*a*, 7*b*, 8*a* to 8*c*, 9, 10*a*, 10*b*, 11, 12, 13*a* and 13*b*. The extended AAC decoder 630 is configured to receive an input information 630*a*, which comprises, for example, a quantized and encoded spectral line information, an encoded scale factor information and an encoded noise filling parameter information. For example, input information 630*a* of the extended AAC encoder 630 may be identical to the output information 228*b* provided by the extended AAC encoder 220*a* described with reference to FIG. 2.

The extended AAC decoder 630 may be configured to provide, on the basis of the input information 630*a*, a representation 630*b* of a scaled and inversely quantized spectrum, for example, in the form of scaled, inversely quantized spectral line values for a plurality of frequency bins (for example, for 1024 frequency bins).

Optionally, the decoder 600 may comprise additional spectrum decoders, like, for example, a TwinVQ spectrum decoder and/or a BSAC spectrum decoder, which may be used alternatively to the extended AAC spectrum decoder 630 in some cases.

The decoder 600 may optionally comprise a spectrum processing 640, which is configured to process the output information 630*b* of the extended AAC decoder 630 in order to obtain an input information 640*a* of a block switching/filterbank 640. The optional spectral processing 630 may comprise one or more, or even all, of the functionalities M/S, PNS, prediction, intensity, long-term prediction, dependently-switched coupling, TNS, dependently-switched coupling, which functionalities are described in detail in ISO/IEC 14493.3: 2005 (E) and the documents referenced therein. If, however, the spectral processing 630 is omitted, the output information 630*b* of the extended AAC decoder 630 may serve directly as input information 640*a* of the block-switching/filterbank 640. Thus, the extended AAC decoder 630 may provide, as the output information 630*b*, scaled and inversely quantized spectra. The block-switching/filterbank 640 uses, as the input information 640*a*, the (optionally pre-processed) inversely-quantized spectra and provides, on the basis thereof, one or more time domain reconstructed audio signals as an output information 640*b*. The filterbank/block-switching may, for example, be configured to apply the inverse of the frequency mapping that was carried out in the encoder (for example, in the block-switching/filterbank 224). For example, an inverse modified discrete cosine transform (IMDCT) may be used by the filterbank. For instance, the IMDCT may be configured to support either one set of 120, 128, 480, 512, 960 or 1024, or four sets of 32 or 256 spectral coefficients.

For details, reference is made, for example, to the International Standard ISO/IEC 14496-3: 2005 (E). The decoder 600 may optionally further comprise an AAC gain control 650, a SBR decoder 652 and an independently-switched coupling 654, to derive the output time signal 612 from the output signal 640*b* of the block-switching/filterbank 640.

However, the output signal 640*b* of the block-switching/filterbank 640 may also serve as the output time signal 612 in the absence of the functionality 650, 652, 654.

2.2.2. Extended AAC Decoder Details

Figure 7A:
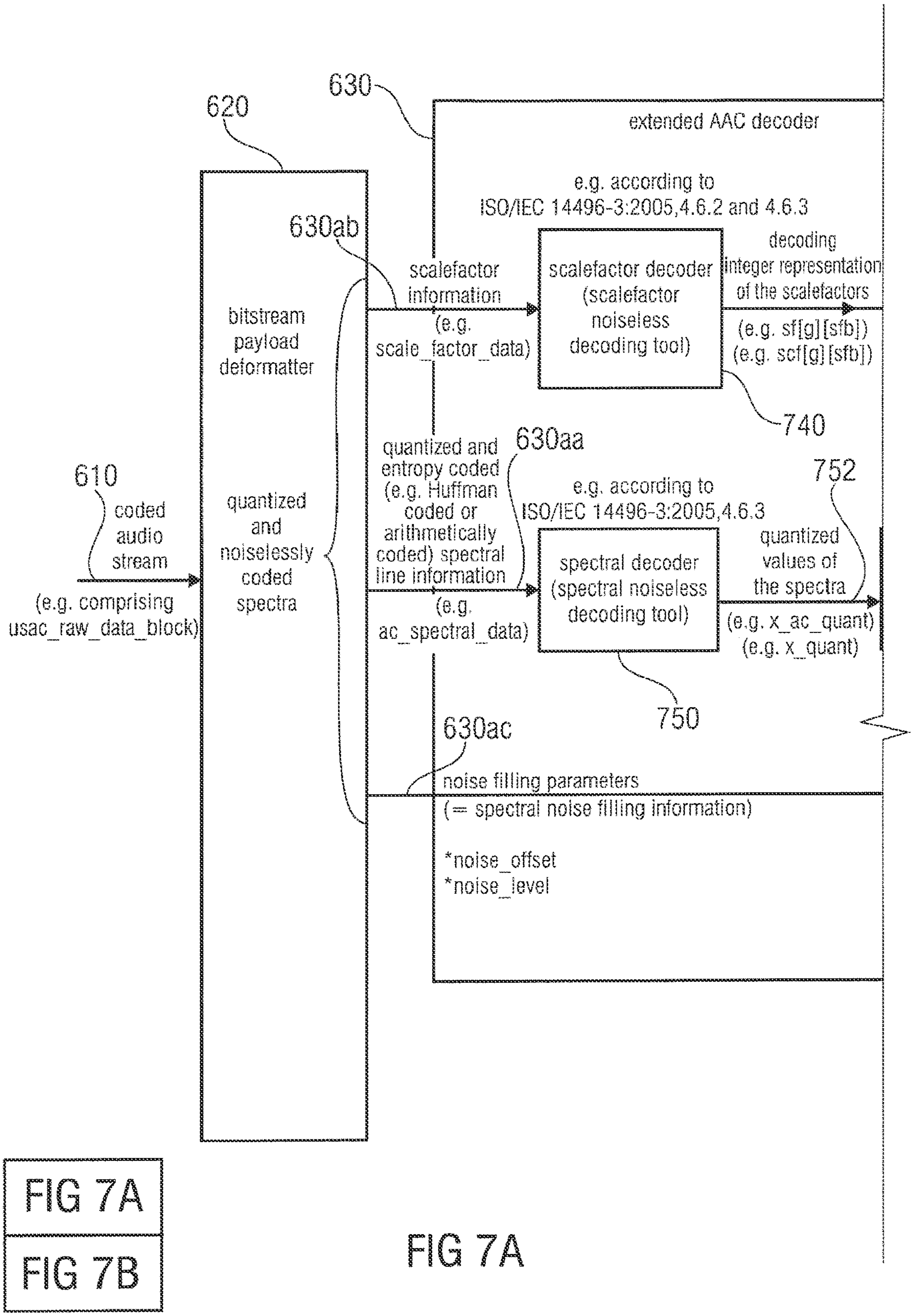
FIG. 7*a* show a block schematic diagram of an extended AAC and 7*b* (advanced audio coding) decoder according to an embodiment of the invention.
Figure 7B:
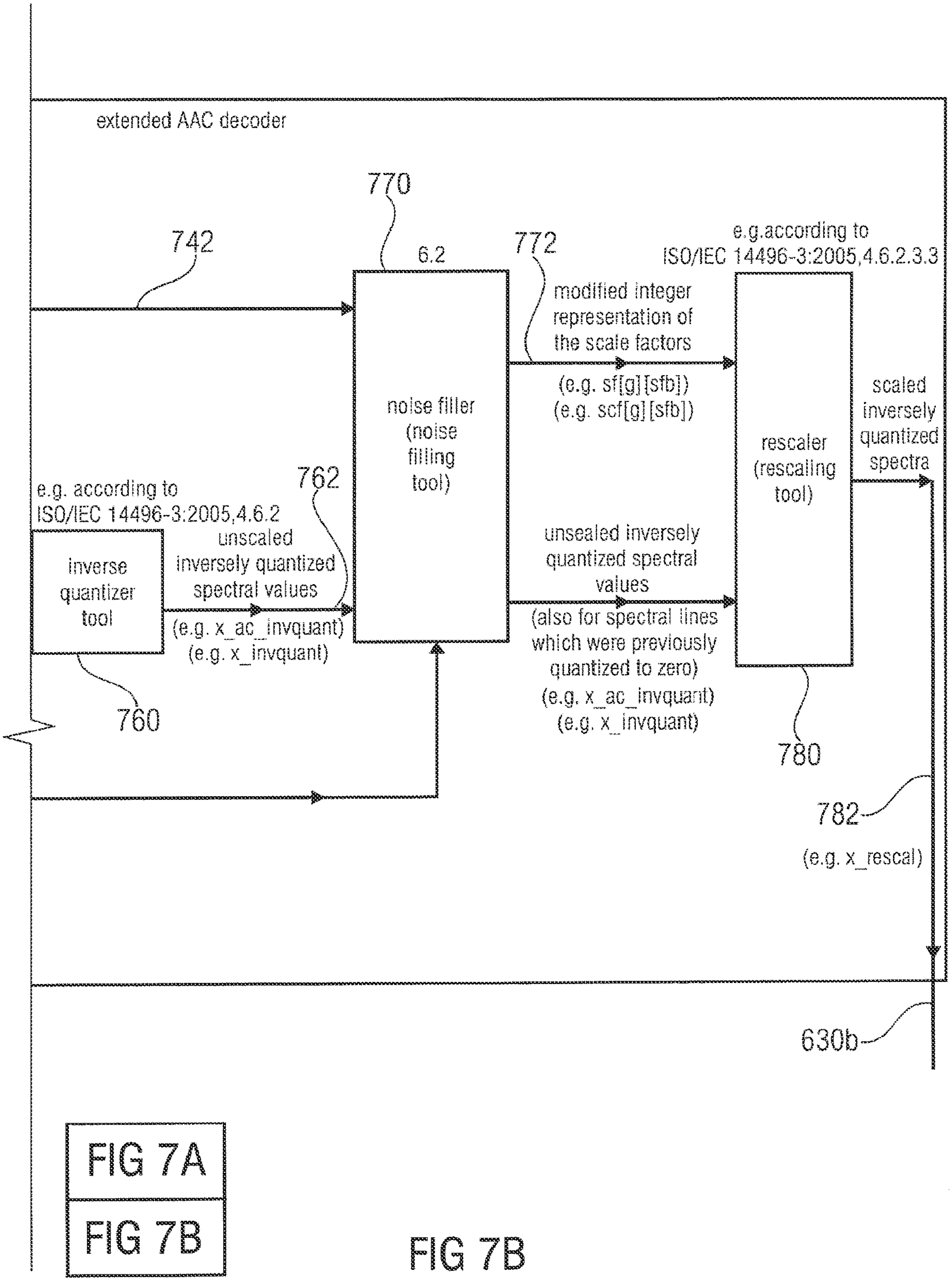

In the following, details regarding the extended AAC decoder will be described, taking reference to FIGS. 7*a* and 7*b*. FIGS. 7*a* and 7*b* show a block schematic diagram of the AAC decoder 630 of FIG. 6 in combination with the bitstream payload deformatter 620 of FIG. 6.

The bitstream payload deformatter 620 receives a decoded audio stream 610, which may, for example, comprise an encoded audio data stream comprising a syntax element entitled "ac_raw_data_block", which is an audio coder raw data block. However, the bit stream payload formatter 620 is configured to provide to the extended AAC decoder 630 a quantized and noiselessly coded spectrum or a representation, which comprises a quantized and arithmetically coded spectral line information 630*aa* (e.g. designated as ac_spectral_data), a scale factor information 630*ab* (e.g. designated as scale_factor_data) and a noise filling parameter information 630*ac*. The noise filling parameter information 630*ac* comprises, for example, a noise offset value (designated with noise_offset) and a noise level value (designated with noise_level).

Regarding the extended AAC decoder, it should be noted that the extended AAC decoder 630 is very similar to the AAC decoder of the International Standard ISO/IEC 14496-3: 2005 (E), such that reference is made to the detailed description in said Standard.

The extended AAC decoder 630 comprises a scale factor decoder 740 (also designated as scale factor noiseless decoding tool), which is configured to receive the scale factor information 630*ab* and to provide on the basis thereof, a decoded integer representation 742 of the scale factors (which is also designated as sf[g] [sfb] or scf[g] [sfb]). Regarding the scale factor decoder 740, reference is made to ISO/IEC 14496-3: 2005, Chapters 4.6.2 and 4.6.3. It should be noted that the decoded integer representation 742 of the scale factors reflects a quantization accuracy with which different frequency bands (also designated as scale factor bands) of an audio signal are quantized. Larger scale factors indicate that the corresponding scale factor bands have been quantized with high accuracy, and smaller scale factors indicate that the corresponding scale factor bands have been quantized with low accuracy.

The extended AAC decoder 630 also comprises a spectral decoder 750, which is configured to receive the quantized and entropy coded (e.g. Huffman coded or arithmetically coded) spectral line information 630*aa* and to provide, on the basis thereof, quantized values 752 of the one or more spectra (e.g. designated as x_ac_quant or x_quant). Regarding the spectral decoder, reference is made, for example, to section 4.6.3 of the above-mentioned International Standard. However, alternative implementations of the spectral decoder may naturally be applied. For example, the Huffman decoder of ISO/IEC 14496-3: 2005 may be replaced by an arithmetical decoder if the spectral line information 630*aa* is arithmetically coded.

The extended AAC decoder 630 further comprises an inverse quantizer 760, which may be a non-uniform inverse quantizer. For example, the inverse quantizer 760 may provide un-scaled inversely quantized spectral values 762 (for example, designated with x_ac_invquant, or x_invquant). For instance, the inverse quantizer 760 may comprise the functionality described in ISO/IEC 14496-3: 2005, Chapter 4.6.2. Alternatively, the inverse quantizer 760 may comprise the functionality described with reference to FIGS. 8*a* to 8*c*.

The extended AAC decoder 630 also comprises a noise filler 770 (also designated as noise filling tool), which receives the decoded integer representation 742 of the scale factors from the scale factor decoder 740, the un-scaled inversely quantized spectral values 762 from the inverse quantizer 760 and the noise filling parameter information 630*ac* from the bitstream payload deformatter 620. The noise filler is configured to provide, on the basis thereof, the modified (typically integer) representation 772 of the scale factors, which is also designated herein with sf[g] [sfb] or scf[g] [sfb]. The noise filler 770 is also configured to provide un-scaled, inversely quantized spectral values 774, also designated as x_ac_invquant or x_invquant on the basis of its input information. Details regarding the functionality of the noise filler will subsequently be described, taking reference to FIGS. 9, 10*a*, 10*b*, 11, 12, 13*a* and 13*b*.

The extended AAC decoder 630 also comprises a rescaler 780, which is configured to receive the modified integer representation of the scale factors 772 and the un-scaled inversely quantized spectral values 774, and to provide, on the basis thereof, scaled, inversely quantized spectral values 782, which may also be designated as x_rescal, and which may serve as the output information 630*b* of the extended AAC decoder 630. The rescaler 780 may, for example, comprise the functionality as described in ISO/IEC 14496-3: 2005, Chapter 4.6.2.3.3.

2.2.3. Inverse Quantizer

Figures 8A, 8B, 8C:
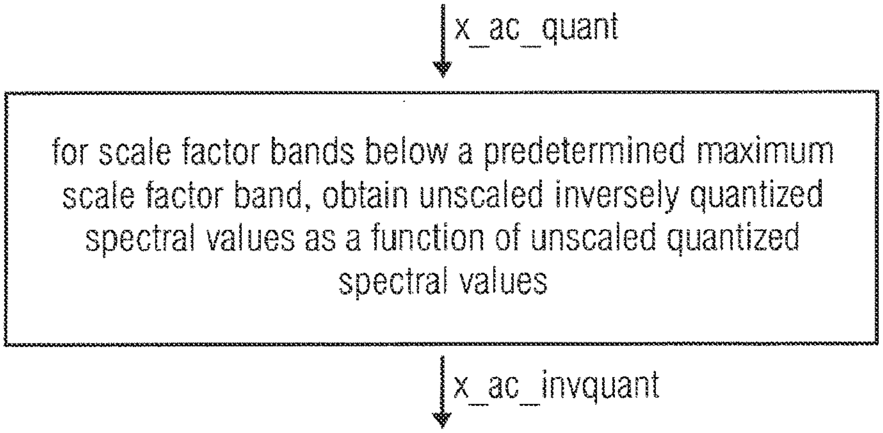
FIG. 8*a* shows a mathematic representation of an inverse quantization, which may be performed in the extended AAC decoder of FIG. 7.
FIG. 8*b* shows a pseudo code program listing of an algorithm for inverse quantization, which may be performed by the extended AAC decoder of FIG. 7.
FIG. 8*c* shows a flow chart representation of the inverse quantization.

In the following, the functionality of the inverse quantizer 760 will be described, taking reference to FIGS. 8*a*, 8*b* and 8*c*. FIG. 8*a* shows a representation of an equation for deriving the un-scaled inversely quantized spectral values 762 from the quantized spectral values 752. In the alternative equations of FIG. 8*a*, "sign(·)" designates a sign operator, and "·" designates an absolute value operator. FIG. 8*b* shows a pseudo program code representing the functionality of the inverse quantizer 760. As can be seen, the inverse quantization according to the mathematical mapping rule shown in FIG. 8*a* is performed for all window groups (designated by running variable g), for all scale factor bands (designated by running variable sfb), for all windows (designated by running index win) and all spectral lines (or spectral bins) (designated by running variable bin). FIG. 8C shows a flow chart representation of the algorithm of FIG. 8*b*. For scale factor bands below a predetermined maximum scale factor band (designated with max_sfb), un-scaled inversely quantized spectral values are obtained as a function of un-scaled quantized spectral values. A non-linear inverse quantization rule is applied.

2.2.4 Noise Filler 2.2.4.1. Noise Filler According to FIGS. 9 to 12

Figure 9:
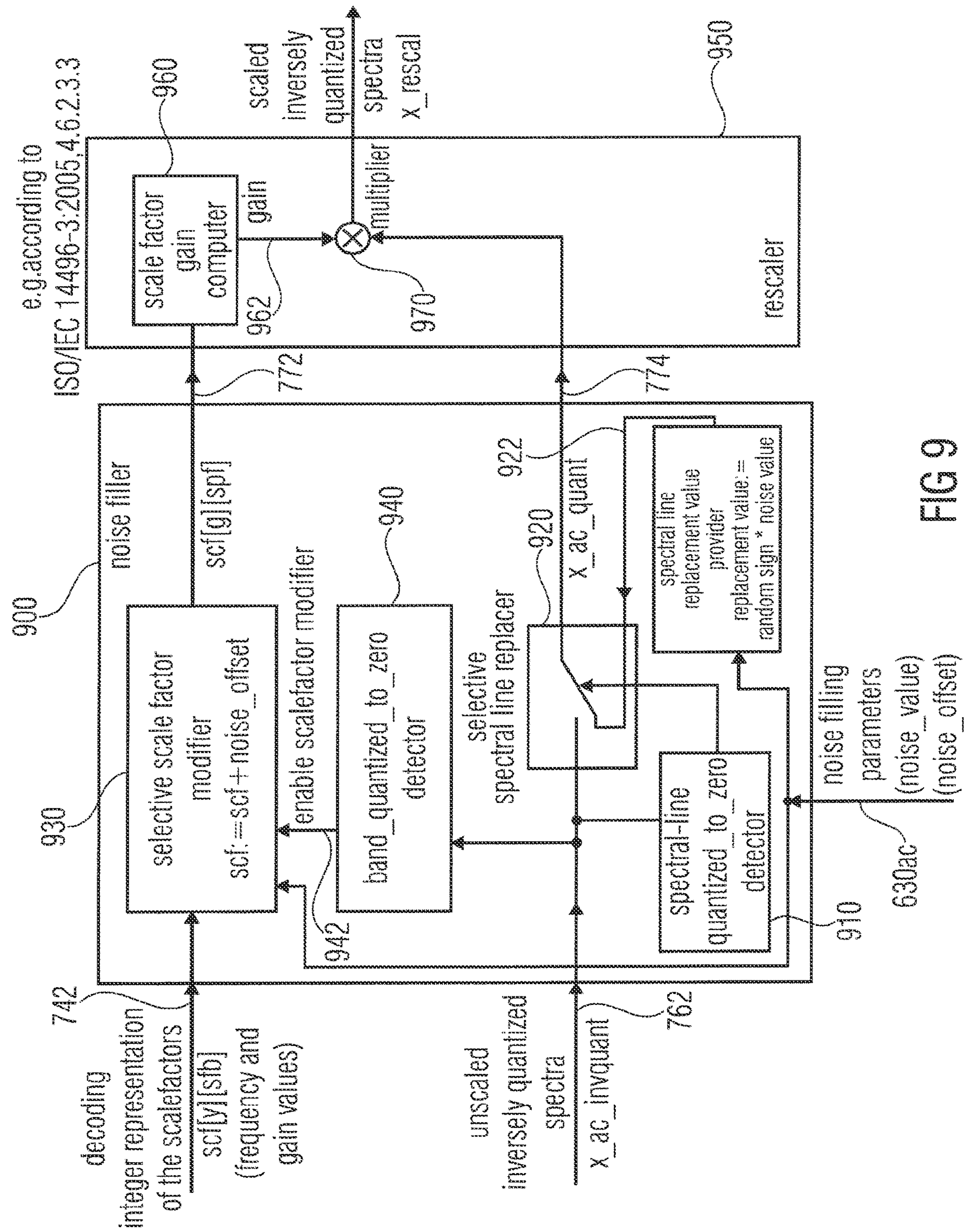
FIG. 9 shows a block schematic diagram of a noise filler and a rescaler, which may be used in the extended AAC decoder of FIG. 7.

FIG. 9 shows a block schematic diagram of a noise filler 900 according to an embodiment of the invention. The noise filler 900 may, for example, take the place of the noise filler 770 described with reference to FIGS. 7A and 7B.

The noise filler 900 receives the decoded integer representation 742 of the scale factors, which may be considered as frequency band gain values. The noise filler 900 also receives the un-scaled inversely quantized spectral values 762. Further, the noise filler 900 receives the noise filling parameter information 630*ac*, for example, comprising noise filling parameters noise_value and noise_offset. The noise filler 900 further provides the modified integer representation 772 of the scale factors and the un-scaled inversely quantized spectral values 774. The noise filler 900 comprises a spectral-line-quantized-to-zero detector 910, which is configured to determine whether a spectral line (or spectral bin) is quantized to zero (and possibly fulfills further noise filling requirements). For this purpose, the spectral-line-quantized-to-zero detector 910 directly receives the un-scaled inversely quantized spectra 762 as input information. The noise filler 900 further comprises a selective spectral line replacer 920, which is configured to selectively replace spectral values of the input information 762 by spectral line replacement values 922 in dependence on the decision of the spectral-line-quantized-to-zero detector 910. Thus, if the spectral-line-quantized-to-zero detector 910 indicates that a certain spectral line of the input information 762 should be replaced by a replacement value, then the selective spectral line replacer 920 replaces the certain spectral line with the spectral line replacement value 922 to obtain the output information 774. Otherwise, the selective spectral line replacer 920 forwards the certain spectral line value without change to obtain the output information 774. The noise filler 900 also comprises a selective scale factor modifier 930, which is configured to selectively modify scale factors of the input information 742. For example, the selective scale factor modifier 930 is configured to increase scale factors of scale factor frequency bands, which have been quantized to zero by a predetermined value, which is designated as "noise_offset". Thus, in the output information 772, scale factors of frequency bands quantized to zero are increased when compared to corresponding scale factor values within the input information 742. In contrast, corresponding scale factor values of scale factor frequency bands, which are not quantized to zero, are identical in the input information 742 and in the output information 772.

For determining whether a scale factor frequency band is quantized to zero, the noise filler 900 also comprises a band-quantized-to-zero detector 940, which is configured to control the selective scale factor modifier 930 by providing an "enable scale factor modification" signal or flag 942 on the basis of the input information 762. For example, the band-quantized-to-zero detector 940 may provide a signal or flag indicating the need for an increase of a scale factor to the selective scale factor modifier 930 if all the frequency bins (also designated as spectral bins) of a scale factor band are quantized to zero.

It should be noted here that the selective scale factor modifier can also take the form of a selective scale factor replacer, which is configured to set scale factors of scale factor bands quantized entirely to zero to a predetermined value, irrespective of the input information 742.

In the following, a re-scaler 950 will be described, which may take the function of the re-scaler 780. The re-scaler 950 is configured to receive the modified integer representation 772 of the scale factors provided by the noise filler and also for the un-scaled, inversely quantized spectral values 774 provided by the noise filler. The re-scaler 950 comprises a scale factor gain computer 960, which is configured to receive one integer representation of the scale factor per scale factor band and to provide one gain value per scale factor band. For example, the scale factor gain computer 960 may be configured to compute a gain value 962 for an i-th frequency band on the basis of a modified integer representation 772 of the scale factor for the i-th scale factor band. Thus, the scale factor gain computer 960 provides individual gain values for the different scale factor bands. The re-scaler 950 also comprises a multiplier 970, which is configured to receive the gain values 962 and the un-scaled, inversely quantized spectral values 774. It should be noted that each of the un-scaled, inversely quantized spectral values 774 is associated with a scale factor frequency band (sfb). Accordingly, the multiplier 970 is configured to scale each of the un-scaled, inversely quantized spectral values 774 with a corresponding gain value associated with the same scale factor band. In other words, all the un-scaled, inversely quantized spectral values 774 associated with a given scale factor band are scaled with the gain value associated with the given scale factor band. Accordingly, un-scaled, inversely quantized spectral values associated with different scale factor bands are scaled with typically different gain values associated with the different scale factor bands.

Thus, different of the un-scaled, inversely quantized spectral values are scaled with different gain values depending on which scale factor bands they are associated to.

Pseudo Program Code Representation

In the following, the functionality of the noise filler 900 will be described taking reference to FIGS. 10A and 10B, which show a pseudo program code representation (FIG. 10A) and a corresponding legend (FIG. 10B). Comments start with "--".

The noise filling algorithm represented by the pseudo code program listing of FIG. 10 comprises a first part (lines 1 to 8) of deriving a noise value (noiseVal) from a noise level representation (noise_level). In addition, a noise offset (noise_offset) is derived. Deriving the noise value from the noise level comprises a non-linear scaling, wherein the noise value is computed according to $$\text{noiseVal}=2^{((noise\_level-14)/3)}.$$

In addition, a range shift of the noise offset value is performed such that the range-shifted noise offset value can take positive and negative values.

A second part of the algorithm (lines 9 to 29) is responsible for a selective replacement of un-scaled, inversely quantized spectral values with spectral line replacement values and for a selective modification of the scale factors. As can be seen from the pseudo program code, the algorithm may be executed for all available window groups (for-loop from lines 9 to 29). In addition, all scale factor bands between zero and a maximum scale factor band (max_sfb) may be processed even though the processing may be different for different scale factor bands (for-loop between lines 10 and 28). One important aspect is the fact that it is generally assumed that a scale factor band is quantized to zero unless it is found that the scale factor band is not quantized to zero (confer line 11). However, the check whether a scale factor band is quantized to zero or not is only executed for scale factor bands, a starting frequency line (swb_offset[sfb]) of which is above a predetermined spectral coefficient index (noiseFillingStartOffset). A conditional routine between lines 13 and 24 is only executed if an index of the lowest spectral coefficients of scale factor band sfb is larger than noise filling start offset. In contrast, for any scale factor bands for which an index of the lowest spectral coefficient (swb_offset[sfb]) is smaller than or equal to a predetermined value (noiseFillingStartOffset), it is assumed that the bands are not quantized to zero, independent from the actual spectral line values (see lines 24*a*,24*b* and 24*c*).

If, however, the index of the lowest spectral coefficients of a certain scale factor band is larger than the predetermined value (noiseFillingStartOffset), then the certain scale factor band is considered as being quantized to zero only if all spectral lines of the certain scale factor band are quantized to zero (the flag "band_quantized_to_zero" is reset by the for-loop between lines 15 and 22 if a single spectral bin of the scale factor band is not quantized to zero.

Consequently, a scale factor of a given scale factor band is modified using the noise offset if the flag "band_quantized_to_zero", which is initially set by default (line 11) is not deleted during the execution of the program code between lines 12 and 24. As mentioned above, a reset of the flag can only occur for scale factor bands for which an index of the lowest spectral coefficient is above the predetermined value (noiseFillingStartOffset). Furthermore, the algorithm of FIG. 10A comprises a replacement of spectral line values with spectral line replacement values if the spectral line is quantized to zero (condition of line 16 and replacement operation of line 17). However, said replacement is only performed for scale factor bands for which an index of the lowest spectral coefficient is above the predetermined value (noiseFillingStartOffset). For lower spectral frequency bands, the replacement of spectral values quantized to zero with replacement spectral values is omitted.

It should further be noted that the replacement values could be computed in a simple way in that a random or pseudo-random sign is added to the noise value (noiseVal) computed in the first part of the algorithm (confer line 17).

It should be noted that FIG. 10B shows a legend of the relevant symbols used in the pseudo program code of FIG. 10A to facilitate a better understanding of the pseudo program code.

Figure 11:
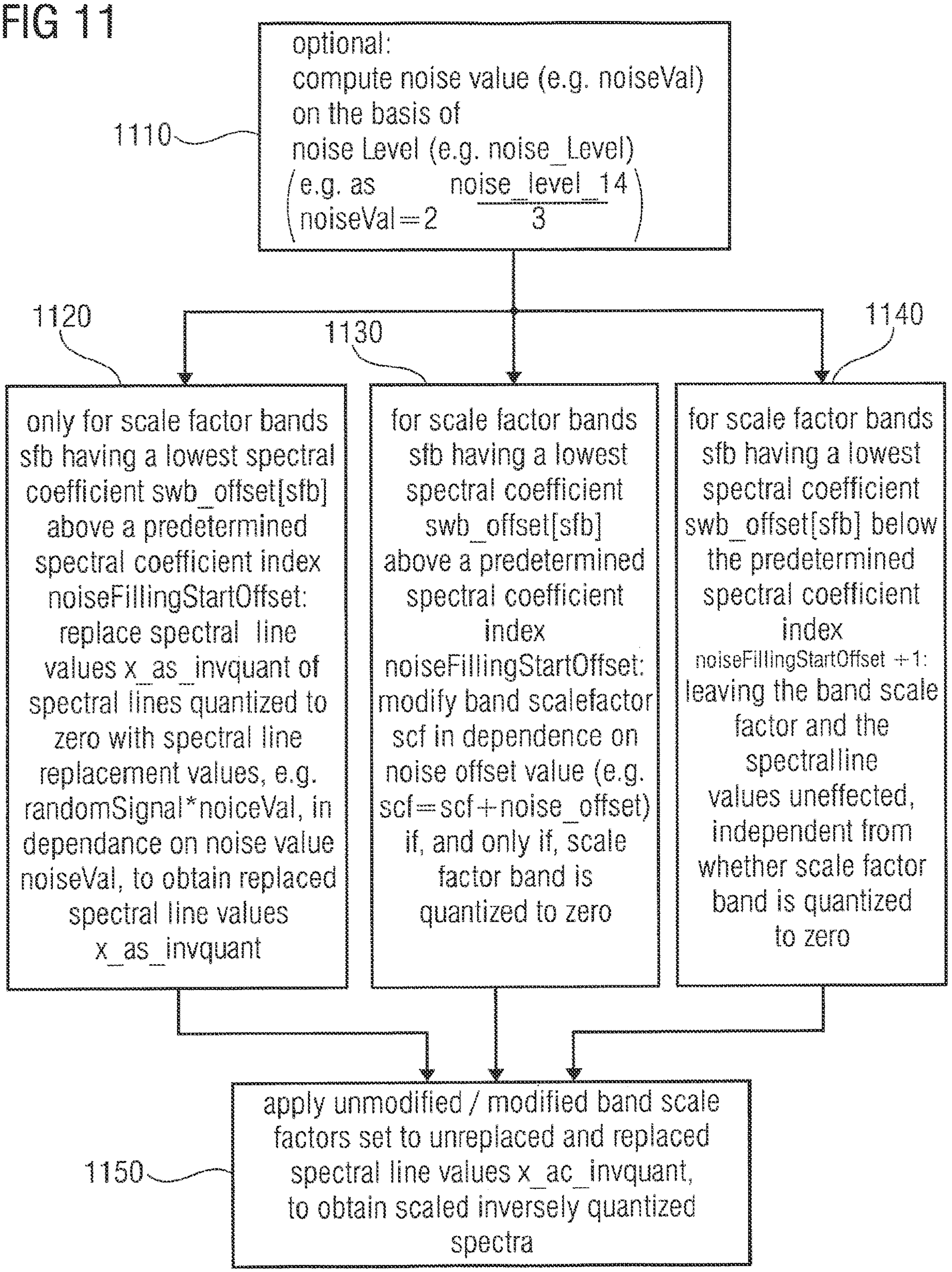
FIG. 11 shows a flow chart of a method, which may be implemented in the noise filler of FIG. 7 or in the noise filler of FIG. 9.

Important aspects of the functionality of the noise filler are illustrated in FIG. 11. As can be seen, the functionality of the noise filler optionally comprises computing 1110 a noise value on the basis of the noise level. The functionality of the noise filler also comprises replacement 1120 of spectral line values of spectral lines quantized to zero with spectral line replacement values in dependence on the noise value to obtain replaced spectral line values. However, the replacement 1120 is only performed for scale factor bands having a lowest spectral coefficient above a predetermined spectral coefficient index.

The functionality of the noise filler also comprises modifying 1130 a band scale factor in dependence on the noise offset value if, and only if, the scale factor band is quantized to zero. However, the modification 1130 is executed in that form for scale factor bands having a lowest spectral coefficient above the predetermined spectral coefficient index.

The noise filler also comprises a functionality of leaving 1140 band scale factors unaffected, independent from whether the scale factor band is quantized to zero, for scale factor bands having a lowest spectral coefficient below the predetermined spectral coefficient index.

Furthermore, the re-scaler comprises a functionality 1150 of applying unmodified or modified (whichever is available) band scale factors to un-replaced or replaced (whichever is available) spectral line values to obtain scaled and inversely quantized spectra.

Figure 12:
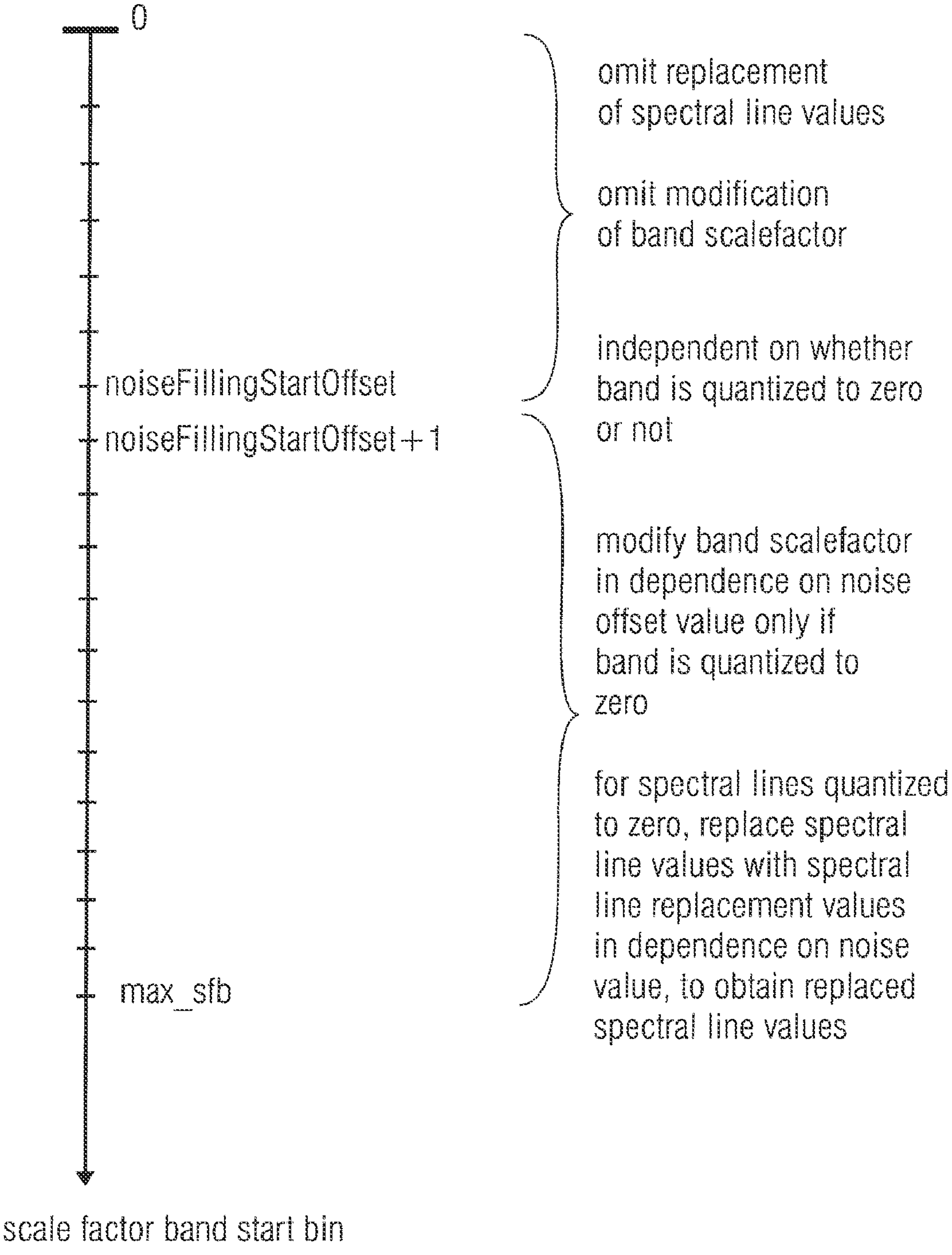
FIG. 12 shows a graphical illustration of the method of FIG. 11.

FIG. 12 shows a schematic representation of the concept described with reference to FIGS. 10A, 10B and 11. In particular, the different functionalities are represented in dependence on a scale factor band start bin.

2.2.4.2 Noise Filler According to FIGS. 13A and 13B

FIGS. 13A and 13B show pseudo code program listings of algorithms, which may be performed in an alternative implementation of the noise filler 770. FIG. 13A describes an algorithm for deriving a noise value (for use within the noise filler) from a noise level information, which may be represented by the noise filling parameter information 630*ac*.

As the mean quantization error is approximately 0.25 most of the time, the noiseVal range [0, 0.5] is rather large and can be optimized.

FIG. 13B represents an algorithm, which may be formed by the noise filler 770. The algorithm of FIG. 13B comprises a first portion of determining the noise value (designated with "noiseValue" or "noiseVal"— line s 1 to 4). A second portion of the algorithm comprises a selective modification of a scale factor (lines 7 to 9) and a selective replacement of spectral line values with spectral line replacement values (lines 10 to 14).

However, according to the algorithm of FIG. 13B, the scale factor (scf) is modified using the noise offset (noise_offset) whenever a band is quantized to zero (see line 7). No difference is made between lower frequency bands and higher frequency bands in this embodiment.

Furthermore, noise is introduced into spectral lines quantized to zero only for higher frequency bands (if the line is above a certain predetermined threshold "noiseFilingStartOffset").

2.2.5. Decoder Conclusion

To summarize, embodiments of the decoder according to the present invention may comprise one or more of the following features:

- Starting from a "noise filling start line" (which may be a fixed offset or a line representing a start frequency replace every 0 with a replacement value
- the replacement value is the indicated noise value (with a random sign) in the quantized domain and then scale this "replacement value" with the scale factor "scf") transmitted for the actual scale factor band; and
- the "random" replacement values can also be derived from e.g. a noise distribution or a set of alternating values weighted with the signaled noise level.

3. Audio Stream 3.1. Audio Stream According to FIGS. 14A and 14B

In the following, an audio stream according to an embodiment of the invention will be described. In the following, a so-called "usac bitstream payload" will be described. The "usac bitstream payload" carries payload information to represent one or more single channels (payload "single_channel_element ( )) and/or one or more channel pairs (channel_pair_element ( )), as can be seen from FIG. 14A. A single channel information (single_channel_element 0) comprises, among other optional information, a frequency domain channel stream (fd_channel_stream), as can be seen from FIG. 14B.

A channel pair information (channel_pair_element) comprises, in addition to additional elements, a plurality of, for example, two frequency domain channel streams (fd_channel_stream), as can be seen from FIG. 14C.

The data content of a frequency domain channel stream may, for example, be dependent on whether a noise filling is used or not (which may be signaled in a signaling data portion not shown here). In the following, it will be assumed that a noise filling is used. In this case, the frequency domain channel stream comprises, for example, the data elements shown in FIG. 14D. For example, a global gain information (global_gain), as defined in ISO/IEC 14496-3: 2005 may be present. Moreover, the frequency domain channel stream may comprise a noise offset information (noise_offset) and a noise level information (noise_level), as described herein. The noise offset information may, for example, be encoded using 3 bits and the noise level information may, for example, be encoded using 5 bits.

In addition, the frequency domain channel stream may comprise encoded scale factor information (a scale_factor_data ( )) and arithmetically encoded spectral data (AC_spectral_data ( )) as described herein and as also defined in ISO/IEC 14496-3.

Optionally, the frequency domain channel stream also comprises temporal noise shaping data (tns_data) ( )), as defined in ISO/IEC 14496-3.

Naturally, the frequency domain channel stream may comprise other information, if useful.

3.2. Audio Stream According to FIG. 15

FIG. 15 shows a schematic representation of the syntax of a channel stream representing an individual channel (individual_channel_stream ( )).

The individual channel stream may comprise a global gain information (global_gain) encoded using, for example, 8 bits, noise offset information (noise_offset) encoded using, for example, 5 bits and a noise level information (noise_level) encoded using, for example, 3 bits.

The individual channel stream further comprises section data (section_data ( )), scale factor data (scale_factor_data ( )) and spectral data (spectral_data ( )).

In addition, the individual channel stream may comprise further optional information, as can be seen from FIG. 15.

3.3. Audio Stream Conclusion

To summarize the above, in some embodiments according to the invention, the following bitstream syntax elements are used:

- Value indicating a noise scale factor offset to optimize the bits needed to transmit the scale factors;
- value indicating the noise level; and/or
- optional value to choose between different shapes for the noise substitution (uniform distributed noise instead of constant values or multiple discrete levels instead of just one).

4. Conclusion

In low bit rate coding, noise filling can be used for two purposes:

- Coarse quantization of spectral values in low bit rate audio coding might lead to very sparse spectra after inverse quantization, as many spectral lines might have been quantized to zero. The sparse populated spectra will result in the decoded signal sounding sharp or instable (birdies). By replacing the zeroed lines with "small" values in the decoder, it is possible to mask or reduce these very obvious artifacts without adding obvious new noise artifacts.
- If there are noise-like signal parts in the original spectrum, a perceptually equivalent representation of these noisy signal parts can be reproduced in the decoder based on only little parametric information, like the energy of the noisy signal part. The parametric information can be transmitted with fewer bits compared to the number of bits needed to transmit the coded waveform.

The newly proposed noise filling coding scheme described herein efficiently combines the above purposes into a single application.

As a comparison, in MPEG-4 audio, the perceptual noise substitution (PNS) is used to only transmit a parameterized information of noise-like signal parts and to reproduce these signal parts perceptionally equivalent in the decoder.

As a further comparison, in AMR-WB+, vector quantization vectors (VQ-vectors) quantized to zero are replaced with a random noise vector where each complex spectral value has constant amplitude, but random phase. The amplitude is controlled by one noise value transmitted with the bitstream.

However, the comparison concepts provide significant disadvantages. PNS can only be used to fill complete scale factor bands with noise, whereas AMR-WB+ only tries to mask artifacts in the decoded signal resulting from large parts of the signal being quantized to zero. In contrast, the proposed noise filling coding scheme efficiently combines both aspects of noise filling into a single application.

According to an aspect, the present invention comprises a new form of noise level calculation. The noise level is calculated in the quantized domain based on the average quantization error.

The quantization error in the quantized domain differs from other forms of quantization error. The quantization error per line in the quantized domain is in the range [−0.5; 0.5] (1 quantization level) with an average absolute error of 0.25 (for normal distributed input values that are usually larger than 1).

In the following, some advantages of noise filling in the quantized domain will be summarized. The advantage of adding noise in the quantized domain is the fact that noise added in the decoder is scaled, not only with the average energy in a given band, but also the psychoacoustic relevance of a band.

Usually, the perceptually most relevant (tonal) bands will be the bands quantized most accurately, meaning multiple quantization levels (quantized values larger than 1) will be used in these bands. Now adding noise with a level of the average quantization error in these bands will have only very limited influence on the perception of such a band.

Bands that are perceptually not as relevant or more noise-like, may be quantized with a lower number of quantization levels. Although much more spectral lines in the band will be quantized to zero, the resulting average quantization error will be the same as for the fine quantized bands (assuming a normal distributed quantization error in both bands), while the relative error in the band may be much higher.

In these coarse quantized bands, the noise filling will help to perceptually mask artifacts resulting from the spectral holes due to the coarse quantization.

A consideration of the noise filling in the quantized domain can be achieved by the above-described encoder and also by the above-described decoder.

5. Implementation Alternatives

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein. Al A further embodiment comprises a computer having installed thereon the computer program for performing one of the methods described herein.

A further embodiment comprises encoder for providing an audio stream on the basis of a transform-domain representation of an input audio signal, where the encoder comprises:

- a quantization error calculator configured to determine a multi-band quantization error over a plurality of frequency bands of the input audio signal, for which separate band gain information is available; and
- an audio stream provider configured to provide the audio stream such that the audio stream comprises an information describing an audio content of the frequency bands and an information describing the multi-band quantization error.

A further embodiment comprises an encoder as in the immediately preceding embodiment, wherein the encoder comprises a quantizer configured to quantize spectral components of different frequency-bands of the transform domain representation using different quantization accuracies in dependence on psychoacoustic relevances of the different frequency bands, to obtain quantized spectral components, wherein the different quantization accuracies are reflected by the band gain information; and

- wherein the audio stream provider is configured to provide the audio stream such that the audio stream comprises an information describing the band gain information and such that the audio stream further comprises the information describing the multi-band quantization error.

A further embodiment comprises an encoder as in the immediately preceding embodiment, wherein the quantizer is configured to perform a scaling of the spectral component in dependence on the band gain information and to perform an integer value quantization of the scaled spectral components; and wherein the quantization error calculator is configured to determine the multi-band quantization error in the quantized domain, such that the scaling of the spectral components, which is performed prior to the integer value quantization, is taken into consideration in the multi-band quantization error.

A further embodiment comprises an encoder as in any of the three immediately preceding embodiments, wherein the encoder is configured to set a band gain information of a frequency band, which is completely quantized to zero, to a value representing a ratio between an energy of the frequency band completely quantized to zero and an energy of the multi-band quantization error.

A further embodiment comprises an encoder as in any of the four immediately preceding embodiments, wherein the quantization error calculator (330) is configured to determine the multi-band quantization error (332) over a plurality of frequency bands each comprising at least one spectral component quantized to a non-zero value while avoiding frequency bands, spectral components of which are entirely quantized to zero.

A further embodiment comprises decoder for providing a decoded representation of an audio signal on the basis of an encoded audio stream representing spectral components of frequency bands of the audio signal, the decoder comprising:

a noise filler configured to introduce noise into spectral components of a plurality of frequency bands, to which separate frequency band gain information is associated, on the basis of a common multi-band noise intensity value.

A further embodiment comprises a decoder as in the immediately preceding embodiment, wherein the noise filler is configured to selectively decide on a per-spectral-bin basis, whether to introduce noise into individual spectral bins of a frequency band in dependence on whether the respective individual spectral bins are quantized to zero or not.

A further embodiment comprises a decoder as in any of the two immediately preceding embodiments, wherein the noise filler is configured to receive a plurality of spectral bin values representing different overlapping or non-overlapping frequency portions of the first frequency band of a frequency domain audio signal representation, and to receive a plurality of spectral bin values representing different overlapping or non-overlapping frequency portions of the second frequency band of the frequency domain audio signal representation; and to replace one or more spectral bin values of the first frequency band of the plurality of frequency bands with a first spectral bin noise value, a magnitude of which is determined by the multi-band noise intensity value, and to replace one or more spectral bin values of the second frequency band of the plurality of frequency bands with a second spectral bin noise value having the same magnitude as the first spectral bin noise value;

wherein the decoder comprises a sealer configured to scale spectral bin values of the first frequency band of the plurality of frequency bands with a first frequency band gain value, to obtain scaled spectral bin values of the first frequency band, and to scale spectral bin values of the second frequency band of the plurality of frequency bands with a second frequency band gain value, to obtain scaled spectral bin values of the second frequency band, such that the replaced (spectral bin values, replaced with the first and second spectral bin noise values, are scaled with different frequency band gain values, and such that the replaced spectral bin value, replaced with the first spectral bin noise value, and un-replaced spectral bin values of the first frequency band representing an audio content of the first frequency band are scaled with the first frequency band gain value, and that the replaced spectral bin value, replaced with the second spectral bin noise value, and un-replaced spectral bin values of the second frequency band representing an audio content of the second frequency band are scaled with the second frequency band gain value.

A further embodiment comprises a decoder as in any of the four immediately preceding embodiments, wherein the noise filler is configured to selectively modify a frequency band gain value of a given frequency band using a noise offset value if the given frequency band is quantized to zero.

A further embodiment comprises a decoder as in any of the four immediately preceding embodiments, wherein the noise filler is configured to replace spectral bin values of spectral bins quantized to zero with spectral bin noise values, magnitudes of which spectral bin noise values are dependent on the multi-band noise intensity value, to obtain replaced spectral bin values, only for frequency bands having a lowest spectral bin index above a predetermined spectral bin index, leaving spectral bin values of frequency bands having a lowest spectral bin index below the predetermined spectral bin index unaffected;

wherein the noise filler is configured to selectively modify, for the frequency bands having a lowest spectral bin index above the predetermined spectral bin index, a band gain value of a given frequency band in dependence on a noise offset value, if the given frequency band is entirely quantized to zero; and wherein the decoder further comprises a sealer configured to apply the selectively-modified or unmodified band gain values to the selectively-replaced or un-replaced spectral bin values, to obtain a scaled spectral information, which represents the audio signal.

A further embodiment comprises a decoder as in any of the five immediately preceding embodiments, wherein the decoder is configured to receive an audio stream comprising a quantized, entropy-encoded representation of spectral bin values for a plurality of frequency bands, wherein a plurality of spectral bin values is associated with a first frequency band of the plurality of frequency bands, and wherein a plurality of spectral bin values is associated with a second frequency band of the plurality of frequency bands, an encoded representation of band gain values, wherein a first band gain value is associated with the first frequency band and a second band gain value is associated with the second frequency band, and an encoded representation of the multi-band noise intensity value; wherein the decoder comprises a spectral decoder configured to provide a quantized, decoded representation of the spectral bin values on the basis of the quantized, entropy-encoded representation of the spectral bin values;

wherein the decoder comprises an inverse quantizer configured to inversely quantize the quantized decoded representation of the spectral bin values, to obtain an inversely quantized, decoded representation (762) of the spectral bin values;

wherein the decoder comprises a scale factor decoder configured to decode the encoded representation of the spectral gain values, to obtain a decoded representation of the spectral gain values; and wherein the noise filler is configured to selectively replace spectral bin values inversely quantized to zero of multiple frequency bands with spectral bin replacement values of identical magnitudes, to obtain replaced spectral bin values of multiple frequency bands; and wherein the decoder comprises a sealer configured to scale a set of all spectral bin values of a first frequency band, some of which spectral bin values of the first frequency band are original inversely quantized, decoded spectral bin values provided by the inverse quantizer and some of which spectral bin values are spectral bin replacement values, with a decoded representation of a scale factor associated with the first frequency band, to obtain a set of scaled spectral bin values of the first frequency band, and to scale a set of all spectral bin values of a second frequency band, some of which spectral bin values of the second frequency band are original inversely quantized, decoded spectral bin values provided by the inverse quantizer and some of which spectral bin values are spectral bin replacement values, with a decoded representation of a scale factor associated with the second frequency band, to obtain a set of scaled spectral bin values of the second frequency band.

A further embodiment comprises a method for providing an audio stream on the basis of a transform-domain representation of an input audio signal, where the method comprises:

determining a multi-band quantization error over a plurality of frequency bands, for which separate band gain information is available; and providing the audio stream such that the audio stream comprises an information describing an audio content of the frequency bands and an information describing the multi-band quantization error.

A further embodiment comprises a method for providing a decoded representation of an audio signal on the basis of an encoded audio stream, where the method comprises:

introducing noise into spectral components of a plurality of frequency bands, to which separate frequency band gain information is associated, on the basis of a common multi-band noise intensity value.

A further embodiment comprises a computer program for performing the method as in any of the two immediately preceding embodiments when the computer program runs on a computer.

A further embodiment comprises an audio stream representing an audio signal, the audio stream comprising:

spectral information describing intensities of spectral components of the audio signal, wherein the spectral information is quantized with different quantization accuracies in different frequency bands; and a noise level information describing a multi-band quantization error over a plurality of frequency bands, taking into account the different quantization accuracies.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

We claim:

1. A decoder for providing a decoded representation of an audio signal on the basis of an encoded audio stream representing spectral components of frequency bands of the audio signal, the decoder comprising:

a noise filler configured to introduce noise into spectral components of a plurality of frequency bands, to which separate frequency band gain values are associated, on the basis of a common multi-band noise intensity value; and a scale factor gain determinator, which is configured to receive one integer representation of a scale factor per scale factor band and to provide one gain value per scale factor band;

wherein the noise filler is configured to selectively modify a frequency band gain value of a given frequency band using a noise offset value if the given frequency band is quantized to zero.

2. A method for providing a decoded representation of an audio signal on the basis of an encoded audio stream representing spectral components of frequency bands of the audio signal, the method comprising:

introducing noise into spectral components of a plurality of frequency bands, to which separate frequency band gain values are associated, on the basis of a common multi-band noise intensity value; and providing one gain value per scale factor band on the basis of one integer representation of a scale factor per scale factor band;

wherein the method comprises selectively modifying a frequency band gain value of a given frequency band using a noise offset value if the given frequency band is quantized to zero.

3. A non-transitory digital storage medium having a computer program stored thereon to perform the method for providing a decoded representation of an audio signal on the basis of an encoded audio stream representing spectral components of frequency bands of the audio signal, the method comprising:

introducing noise into spectral components of a plurality of frequency bands, to which separate frequency band gain values are associated, on the basis of a common multi-band noise intensity value; and providing one gain value per scale factor band on the basis of one integer representation of a scale factor per scale factor band;

wherein the method comprises selectively modifying a frequency band gain value of a given frequency band using a noise offset value if the given frequency band is quantized to zero, when said computer program is run by a computer.

* * * * *